US012763833B2

(12) United States Patent
Li et al.

(10) Patent No.: US 12,763,833 B2
(45) Date of Patent: Oct. 13, 2026

(54) INFORMATION REPORTING METHOD, INFORMATION RECEIVING METHOD, DEVICE, AND STORAGE MEDIUM

(71) Applicant: ZTE CORPORATION, Shenzhen (CN)

(72) Inventors: Yong Li, Shenzhen (CN); Hao Wu, Shenzhen (CN); Zhaohua Lu, Shenzhen (CN); Yuxin Wang, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 301 days.

(21) Appl. No.: 18/293,894

(22) PCT Filed: May 26, 2022

(86) PCT No.: PCT/CN2022/095287
§ 371 (c)(1),
(2) Date: Jan. 31, 2024

(87) PCT Pub. No.: WO2023/050843
PCT Pub. Date: Apr. 6, 2023

(65) Prior Publication Data
US 2025/0125848 A1 Apr. 17, 2025

(30) Foreign Application Priority Data
Sep. 29, 2021 (CN) .......................... 202111154915.4

(51) Int. Cl.
*H04B 7/06* (2006.01)
*H04B 7/0456* (2017.01)

(52) U.S. Cl.
CPC ......... *H04B 7/0626* (2013.01); *H04B 7/0456* (2013.01)

(58) Field of Classification Search
None
See application file for complete search history.

(56) References Cited

U.S. PATENT DOCUMENTS

2017/0264405 A1 9/2017 Gao et al.
2019/0379514 A1 12/2019 Lee et al.
(Continued)

FOREIGN PATENT DOCUMENTS

CN 112312463 A 2/2021
EP 4280469 A1 11/2023

OTHER PUBLICATIONS

Extended European Search Report for corresponding Application No. EP 22 874 241.7, dated Oct. 27, 2025, 12 pages.
(Continued)

*Primary Examiner* — Saad Khawar
(74) *Attorney, Agent, or Firm* — Dority & Manning, P.A.

(57) ABSTRACT

The present application provides an information reporting method, an information receiving method, a device, and a storage medium. The information reporting method applied to a first communication node comprises: receiving first configuration information and second configuration information of a second communication node; receiving a channel state information reference signal transmitted by the second communication node, in accordance with the first configuration information; and reporting channel state information according to the channel state information reference signal and the second configuration information.

15 Claims, 2 Drawing Sheets

(56) References Cited

U.S. PATENT DOCUMENTS

| | | | |
|---|---|---|---|
| 2021/0021318 A1 | 1/2021 | Li et al. | |
| 2021/0175937 A1 | 6/2021 | Yamada et al. | |
| 2021/0211173 A1 | 7/2021 | Rahman et al. | |
| 2023/0029296 A1 | 1/2023 | Li et al. | |
| 2023/0319605 A1 | 10/2023 | Park et al. | |
| 2024/0380442 A1* | 11/2024 | Zhang .................. | H04B 7/0478 |

OTHER PUBLICATIONS

Partial Supplementary European Search Report for corresponding Application No. EP 22874241.7, dated Aug. 12, 2025, 13 pages.
PCT International Search Report and Written Opinion for corresponding PCT Application No. PCT/CN2022/095287, mailed Aug. 12, 2022, 12 pages.
3rd Generation Partnership Project, 3GPP TS 38.211 V16.3.0, Technical Specification Group Radio Access Network: NR: Physical channels and modulation (Release 16), Sep. 2020, 128 pages.
3rd Generation Partnership Project, 3GPP TS 38.214 V16.3.0, Technical Specification Group Radio Access Network; NR; Physical layer procedures for data (Release 16), Sep. 2020, 165 pages.
3rd Generation Partnership Project, 3GPP TS 38.331 V16.3.0, Technical Specification Group Radio Access Network; NR; Radio Resource Control (RRC) protocol specification (Release 16), Dec. 2020, 929 pages.
3rd Generation Partnership Project, 3GPP TSG RAN WGI Meeting #107-e, e-Meeting, Nov. 11-19, 2021, 153 pages.
3rd Generation Partnership Project, 3GPP TSG RAN WG1 Meeting #106bis-e, e-Meeting, Oct. 11-19, 2021, 166 pages.

* cited by examiner

INFORMATION REPORTING METHOD, INFORMATION RECEIVING METHOD, DEVICE, AND STORAGE MEDIUM

CROSS-REFERENCE TO RELATED APPLICATION(S)

This application is a national phase entry under 35 USC 371 of International Patent Application No. PCT/CN2022/095287 filed on May 26, 2022, the International Patent Application is filed based on Chinese Patent Application with the application No. 202111154915.4, filed on Sep. 29, 2021, and claims priority to the Chinese Patent Application, the entire contents of the International Patent Application and the Chinese Patent Application are incorporated herein by reference.

TECHNICAL FIELD

The present disclosure relates to the field of communication, and specifically to an information reporting and receiving method, a device and a storage medium.

BACKGROUND

In a wireless communication system, a base station may determine a data transmission strategy according to a channel state represented by received channel state information, and perform data transmission in accordance with the data transmission strategy, so as to improve the data transmission efficiency. Therefore, how to design a processing mechanism for the channel state information, so as to improve the accuracy of obtaining the channel state and reduce the used resource overhead, and reduce the system complexity, is still an urgent problem.

SUMMARY

Embodiments of the present disclosure provide an information reporting method, applied to a first communication node, the method includes:

- receiving first configuration information and second configuration information of a second communication node;
- receiving a channel state information reference signal transmitted by the second communication node, in accordance with the first configuration information; and
- reporting channel state information according to the channel state information reference signal and the second configuration information.

The embodiments of the present disclosure provide an information receiving method, applied to a second communication node, the method includes:

- transmitting first configuration information and second configuration information to a first communication node, so as to enable the first communication node to determine to-be-reported channel state information according to the first configuration information and the second configuration information; and receiving channel state information reported by the first communication node.

The embodiments of the present disclosure provide a communication device, including: a communication module, a memory, and one or more processors;

- where the communication module is configured to perform communication interaction between a first communication node and a second communication node;
- the memory is configured to store one or more programs;
- the one or more programs, upon being executed by the one or more processors, cause the one or more processors to implement the method as described in any one of the above embodiments.

The embodiments of the present disclosure provide a storage medium storing a computer program, where the computer program, upon being executed by a processor, implements the method as described in any one of the above embodiments.

DETAILED DESCRIPTION

Figure 1:
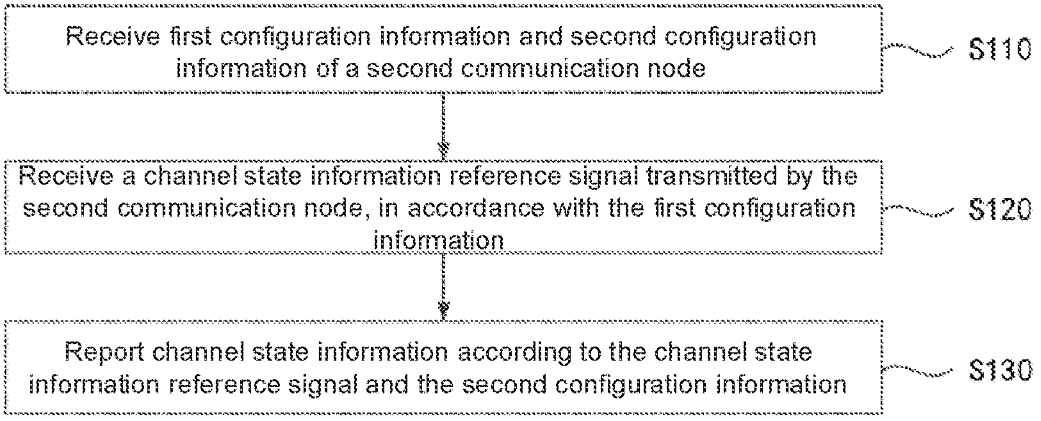
FIG. 1 is a flow chart of an information reporting method provided by the embodiments of the present disclosure.

The embodiments of the present disclosure are explained below in combination with the drawings. The present disclosure is described below in combination with the drawings of the embodiments, and the examples given are only for the purpose of explaining the present disclosure but are not used to limit the scope of the present disclosure.

The wireless communication has been developed to the fifth generation of communication technology. Therein, long-term evolution (LTE) technology in the fourth generation of wireless communication technology and new radio (NR) technology in the fifth generation of wireless communication technology are based on orthogonal frequency division multiplexing (OFDM); in the OFDM technology, the smallest frequency domain unit is a subcarrier, the smallest time domain unit is an OFDM symbol; for facilitating the usage of frequency domain resources, a resource block (RB) is defined, where one resource block is defined as a specific number of continuous subcarriers; and further, a bandwidth block (Bandwidth Part, BWP) is defined, where one bandwidth block is defined as another specific number of continuous resource blocks on a carrier; for facilitating the usage of time domain resources, a slot is defined, where one slot is defined as another specific number of continuous OFDM symbols.

A method for acquiring channel state information in a wireless communication system, and a method for transmitting data with channel state information, include the following steps: a base station transmits a reference signal; a terminal measures the reference signal, determines channel state information from the base station to the terminal, and reports the channel state information to the base station; and the base station receives the channel state information reported by the terminal. The base station determines a strategy for transmitting data according to a channel state represented by the received channel state information, and transmits data, thereby improving the efficiency of data transmission. Therein, the accuracy of the channel state represented by the channel state information affects the transmission strategy of the base station, thereby affecting the efficiency of data transmission. At the same time, the base station transmitting the reference signal needs to occupy an overhead of downlink resources, and the terminal uploading the channel state information needs to occupy an overhead of uplink resources. On the other hand, the increasing of the system complexity will increase the cost of the system, and increase the loss of energy. Therefore, multiple factors need to be considered comprehensively in the design aspect.

The development of wireless communication technology needs to further design a mechanism of processing the channel state information, so to improve the accuracy of the obtained channel state and reduce the used resource overhead, and further, reduce the complexity of the system.

The reference signal transmitted by the base station to the terminal is a downlink reference signal; the downlink reference signal for reporting the channel state information in the LTE system includes a cell-specific reference signal (CRS), and a channel state information reference signal (CSI-RS); the downlink reference signal for reporting the channel state information in the NR system includes a CSI-RS. The CSI-RS is carried by a channel state information reference signal resource (CSI-RS resource), and the channel state information reference signal resource consists of CDM groups, where a CDM group consists of wireless resource elements, and the CSI-RS of a group of CSI-RS ports is multiplexed thereon by code division multiplexing.

A content of the channel state information transmitted between the base station and the terminal includes a channel quality indicator (CQI) for indicating a quality of a channel; or includes a precoding matrix indicator (PMI) for indicating a precoding matrix applied to a base station antenna. A type of reporting format of the CQI is wideband CQI reporting, that is, a channel quality is reported for a channel state information reporting band (CSI reporting band), where the channel quality corresponds to the entire channel state information reporting band; another type of reporting format of the CQI is subband CQI reporting, that is, channel qualities are given respectively in a unit of subband for the channel state information reporting band (CSI reporting band), where a channel quality corresponds to a subband, that is, a channel quality is reported for each subband of the channel state information reporting band. The subband is a frequency domain unit, and defined as N continuous RBs, where N is a positive integer; for ease of description, the subband is referred to as a channel quality indication subband, or a CQI subband, or a subband in the present disclosure; where N is referred to as a size of the CQI subband, or as a CQI subband size, or as subband size. A bandwidth block (BWP, Bandwidth part) is divided into subbands, and the channel state information reporting band (CSI reporting band) is defined by using a subset of subbands of the bandwidth block (BWP, Bandwidth part). The channel state information reporting band (CSI reporting band) is a band where the channel state information on the CSI reporting band needs to be reported.

One way to determine the channel quality is to determine the channel quality according to a strength of the reference signal received by the terminal; another way to determine the channel quality is to determine the channel quality according to a signal-to-noise ratio of the received reference signal. On a channel state information reporting band, if the channel quality does not change much, reporting the CQI by the wideband CQI reporting may reduce the resource overhead for CQI reporting; if channel quality varies widely in the frequency domain, reporting the CQI by the subband CQI reporting may increase the accuracy of CQI reporting.

A type of reporting format of the PMI is wideband PMI reporting, that is, a PMI is reported for the channel state information reporting band, and the PMI corresponds to the entire channel state information reporting band. Another type of reporting format of the PMI is subband PMI reporting, that is, a PMI is reported for each subband of the channel state information reporting band, or a component of a PMI is reported for each subband of the channel state information reporting band. For example, the PMI consists of X1 and X2, one way to report components of a PMI for each subband of the channel state information reporting band is that: an X1 is reported for the entire band and an X2 is reported for each subband; and another way to report components of a PMI for each subband of the channel state information reporting band is that: an X1 and an X2 are reported for each subband.

A further type of reporting format of the PMI is that the reported PMI indicates R precoding matrices for each subband, where R is a positive integer. In the sense of a frequency domain granularity for feeding back the precoding matrix, R also represents a number of precoding matrix subbands included in each subband, or a number of precoding matrix subbands included in each CQI subband.

In a method for reporting channel state information, the terminal receives configuration information (including first configuration information and second configuration information) of the base station, the terminal receives a channel state information reference signal transmitted by the base station, according to the configuration information, and the terminal reports the channel state information according to the configuration information;

where the channel state information includes a precoding matrix indicator, the precoding matrix is determined by a first group of vectors, or by a first group of vectors and a second group of vectors; the first group of vectors includes L vectors, the second group of vectors includes $M_v$ vectors, where L and $M_v$ are positive integers; where a vector in the first group of vectors corresponds to a port of the channel state information reference signal; a vector in the second group of vectors is a DFT vector with an index number $$n_3^{(f)};$$

where an element of the DFT vector with the index number $$n_3^{(f)}$$

is $$e^{j\frac{2\pi t n_3^{(f)}}{N_3}},$$

where t={0, 1 . . . , $N_3$−1}, and $N_3$ is a number of the precoding matrices.

t is an index number of the element in the DFT vector, with values of 0, 1, . . . , $N_3$−1. t may also represent an index number of the precoding matrix. t may also represent an index number of a frequency domain unit, and a value of t corresponds to a frequency domain unit. For example, the precoding matrix with the index number t corresponding to the element with the index number t of the DFT vector in the second group of vectors is a precoding matrix of the frequency domain unit with the index number t.

The precoding matrix may only consist of the first group of vectors, or may consist of the first group of vectors and the second group of vectors. The precoding matrix only consists of the first group of vectors, where an example of one layer is: $W=W_1W_2$, where W represents the precoding matrix, $W_1$ represents a matrix consisting of the first group of vectors, and $W_2$ represents coefficients for combining the first group of vectors to form the precoding matrix, and expresses as a matrix. The precoding matrix consists of the first group of vectors and the second group of vectors, where an example of one layer is: $W=W_1W_2W_f$, where W represents the precoding matrix, $W_1$ represents a matrix consisting of the first group of vectors, $W_f$ represents a matrix consisting of the second group of vectors, and $W_2$ represents coefficients for combining the first group of vectors and the second group of vectors to form the precoding matrix, and expresses as a matrix.

For the terminal to report the CSI the base station transmits, to the terminal, a CSI-RS resource, where a number of ports of the CSI-RS resource is P; the terminal selects $K_1$ ports from the P CSI-RS ports, where L ports are selected in each polarization direction, $K_1=2L$; each port of the L ports is mapped to a vector in the first group of vectors; a number of coefficients forming one layer of the precoding matrix reported by the terminal does not exceed $K_0$, the reported total number of coefficients forming all layers of the precoding matrix does not exceed $2K_0$; where $K_0=\lceil 2LM_v\beta \rceil$, β is a parameter configured by the base station to the terminal. The terminal reports to the base station, the number $K^{NZ}$ of coefficients reported.

A way of a port with a sequence number $m_i$ being mapped to a vector $v_{m_i}$ is that, $v_{m_i}$ is a vector including P/2 elements, where a ($m_i$ mod P/2)-th element is 1, and the rest of elements are 0; where mod represents a modular operation, $m_i$ represents a dividend, P/2 represents a divisor; the first element is a 0-th element. P being 8, and $m_i$ being 2 are taken as an example, $v_2=[0, 0, 1, 0]^T$; where T represents transposition.

For an example of $W_1$ consisting of L vectors, where $$W_1 = \begin{bmatrix} v_{m_0} & v_{m_1} & \cdots & v_{m_{L-1}} & O & O & O & O \\ O & O & O & O & v_{m_0} & v_{m_1} & \cdots & v_{m_{L-1}} \end{bmatrix},$$

where O represents a vector which contains P/2 elements and of which all the elements are 0.

Let a vector in the second group of vectors be $y^{(f)}$, where f=0, 1, . . . , $M_v-1$; for example, $M_v$ vectors in the second group of vectors are $y^{(0)}$, $y^{(1)}$, . . . $y^{(M_v-1)}$, are row vectors. In an example of $W_f$ consisting of the $M_v$ vectors in the second group of vectors, $$W_f = \begin{bmatrix} y^{(0)} \\ y^{(1)} \\ \vdots \\ y^{(M_v-1)} \end{bmatrix}.$$

In a case where the precoding matrix only consists of the first group of vectors, an example of one layer of the precoding matrix is: $W=W_1W_2$, where W represents the precoding matrix; $W_1$ represents a matrix consisting of the first group of vectors, the dimension of $W_1$ is P×2L, that is, a first dimension is P and a second dimension is 2L; $W_2$ represents coefficients for combining the first group of vectors to form the precoding matrix, and expresses as a matrix, the dimension of $W_2$ is 2L×1, that is, a first dimension is 2L and a second dimension is 1; that is, the number of elements included in $W_2$ is 2L, i.e., the number of coefficients forming one layer of the precoding matrix is 2L.

In a case where the precoding matrix consists of the first group of vectors and the second group of vectors, an example of one layer of the precoding matrix is: $W=W_1W_2W_f$, where W represents the precoding matrix; $W_1$ represents a matrix consisting of the first group of vectors, the dimension of $W_1$ is P×2L, that is, a first dimension is P and a second dimension is 2L; $W_f$ represents a matrix consisting of the second group of vectors, the dimension of $W_f$ is $M_v \times N_3$, that is, a first dimension is $M_v$, a second dimension is $N_3$; $W_2$ represents coefficients for combining the first group of vectors and the second group of vectors to form the precoding matrix, and expresses as a matrix, the dimension of $W_2$ is $2L \times M_v$, that is, a first dimension is 2L and a second dimension is $M_v$; that is, the number of elements included in $W_2$ is $2LM_v$, i.e., the number of coefficients forming one layer of the precoding matrix is $2LM_v$.

In order to save the overhead of reporting the precoding matrix indicator by the terminal, the terminal reports only a part of the coefficients forming the precoding matrix; for example, the base station configures a parameter β for the terminal, so as to determine a parameter $K_0$, $K_0=\lceil 2LM_v\beta \rceil$, where β is a positive number less than or equal to 1; for the coefficients forming one layer of the precoding matrix, a number of coefficients reported to the base station by the terminal does not exceed $K_0$; for the coefficients forming all layers of the precoding matrix, a number of coefficients reported to the base station by the terminal does not exceed $2K_0$ in total. In order to enable the base station to receive the reported coefficients, the terminal also reports the number $K^{NZ}$ of the reported coefficients to the base station, and reports the bit mapping (bitmap), where a non-zero bit of the bit mapping is used to indicate which coefficients in the coefficients forming the precoding matrix are reported.

In an embodiment, FIG. 1 is a flow chart of an information reporting method provided by the embodiments of the present disclosure. This embodiment may be performed by a first communication node. Therein, the first communication node may be a terminal side (e.g., a user equipment). As shown in FIG. 1, this embodiment includes S110-S130:

S110, receiving first configuration information and second configuration information of a second communication node;

S120, receiving a channel state information reference signal transmitted by the second communication node, in accordance with the first configuration information;

S130, reporting channel state information according to the channel state information reference signal and the second configuration information.

In an embodiment, the channel state information includes a precoding matrix indicator; a precoding matrix corresponding to the precoding matrix indicator is determined by a first group of vectors, or by a first group of vectors and a second group of vectors;

where the first group of vectors includes L vectors, the second group of vectors includes $M_v$ vectors; where L and $M_v$ are both positive integers;

a vector in the first group of vectors corresponds to a channel state information reference signal port; an element in a vector in the second group of vectors corresponds to a precoding matrix.

In an embodiment, the first communication node refers to the terminal, and the second communication node refers to the base station. In an embodiment, the first configuration information includes an identification of a channel state information reference signal resource, and a number of a channel state information reference signal resource ports; where the channel state information reference signal resource is used to carry the channel state information reference signal, the channel state information reference signal port is used to transmit the channel state information reference signal, the channel state information reference signal port is mapped to the channel state information reference signal resource, a number of the channel state information reference signal ports is also referred to as a number of channel state information reference signal resource ports. The terminal learns the channel state information reference signal resource corresponding to the channel state information to be fed back according to the identification of the channel state information reference signal resource, thereby determining to measure the corresponding channel state information reference signal resource; and completely measures the channel state information reference signal according to a number of the channel state information reference signal resource ports. In an embodiment, the second configuration information includes codebook type information, where the codebook type information is used to indicate a type of the precoding matrix reported by the terminal. For example, the codebook type information is used to indicate a precoding matrix type corresponding to a protocol version, i.e., indicate a precoding matrix type corresponding to which standard protocol version; because there are multiple standard protocol versions with mechanisms of feeding back the precoding matrix, but there are differences between the different standard protocol versions. For another example, the codebook type information is used to indicate a feature of the mechanism of feeding back the precoding matrix, e.g., a direct selection of a space domain vector, or a linear combination of space domain vectors, or a linear combination of a space domain vector and a frequency domain vector, or a selection of an antenna port. For another example, the codebook type information is used to indicate a precoding matrix for a single antenna panel, or a precoding matrix for multiple antenna panels. The terminal may adopt the correct mechanism and method to feed back the precoding matrix, according to the codebook type information.

In an embodiment, the first configuration information includes a number P of channel state information reference signal ports; reporting the channel state information, includes: select $K_1$ channel state information reference signal ports from the P channel state information reference signal ports; where L channel state information reference signal ports are selected in each polarization direction, $K_1=2L$; where each channel state information reference signal port in the L channel state information reference signal ports is mapped to a vector in the first group of vectors.

In an embodiment, the second configuration information includes a first proportion parameter; a manner for determining $K_1$ includes: determining $K_1$ according to the number P of the channel state information reference signal ports and the first proportion parameter.

In an embodiment, determining $K_1$ according to the number P of the channel state information reference signal ports and the first proportion parameter, includes: determining a product value of the number P of the channel state information reference signal ports and the first proportion parameter; determining a rounding value of a product value between the product value and a predetermined first fixed value; and determining $K_1$ according to the rounding value and a predetermined second fixed value.

In an embodiment, determining $K_1$ according to the number P of the channel state information reference signal ports and the first proportion parameter, includes: determining a rounding value, where the rounding value is a rounding value of a product value of the number P of the channel state information reference signal ports, the first proportion parameter and a predetermined first fixed value; and determining $K_1$ according to the rounding value and a predetermined second fixed value.

In an embodiment, a product value between the number P of the channel state information reference signal ports, the first proportion parameter and a predetermined first fixed value is determined, and the rounding value is obtained by rounding the product value, and a product value of the rounding value and a preset second fixed value is used as $K_1$. It should be noted that, rounding the product value between the number P of the channel state information reference signal ports, the first proportion parameter and a predetermined first fixed value, may also be understood as rounding a product value of reciprocals of the number P of the channel state information reference signal ports, the first proportion parameter and a predetermined first fixed value.

In an embodiment, determining $K_1$ according to the number P of the channel state information reference signal ports and the first proportion parameter, includes: determining $K_1$ according to a product value of the number P of the channel state information reference signal ports and the first proportion parameter.

In an embodiment, the second configuration information includes a first proportion parameter; a manner for determining L includes: determining a product value of the number P of the channel state information reference signal ports and the first proportion parameter; and determining L according to a rounding value of a product value between the product value and a predetermined first fixed value.

In an embodiment, the second configuration information includes a first proportion parameter; a manner for determining L includes: determining the L according to a rounding value, where the rounding value is a rounding value of a product value of the number P of the channel state information reference signal ports, the first proportion parameter and a predetermined first fixed value.

In an embodiment, a product value between the number P of the channel state information reference signal ports, the first proportion parameter and a predetermined first fixed value is determined, and a rounding value is obtained by rounding the product value, and a product value of the rounding value and a preset second fixed value is used as L. It should be noted that, rounding the product value between the number P of the channel state information reference signal ports, the first proportion parameter and a predetermined first fixed value, may also be understood as rounding a product value of reciprocals of the number P of the channel state information reference signal ports, the first proportion parameter and a predetermined third fixed value.

In an embodiment, the base station controls a scale of the first group of vectors for combining the precoding matrix by configuring the indication parameter $K_1$ or L to the terminal, in order to optimize the reduction of the computation burden of the terminal and improve the feedback performance. A scheme for indicating the parameter $K_1$ is that: the base station configures the first proportion parameter α for the terminal; the parameter $K_1$ is equal to a product value of the number of CSI-RS resource ports and the first proportion parameter α. The usage of a dual-polarization antenna port to transmit signals, may reduce the space size occupied by the antenna array, and enhance the stability of the transmitted signal. The CSI-RS resource corresponds to the dual-polarization antenna port, i.e., one polarization direction corresponds to a half of the CSI-RS resource ports, and another polarization direction corresponds to another half of the CSI-RS resource ports. Selecting $K_1$ ports from the P CSI-RS resource ports requires a polar common based mode for selecting; that is, L CSI-RS antenna ports are selected in one polarization direction, and correspondingly, the corresponding L CSI-RS antenna ports are selected in another polarization direction, $K_1$=2L; so that the fed-back precoding matrix matches with the dual-polarization antenna port. Therefore, the above scheme for configuring the parameter $K_1$ cannot meet the risk of the polar common based mode for selecting the CSI-RS resource ports. For example, a candidate value of P may include {2, 4, 8, 12, 16, 24, 32}, a candidate value of α may include {½, ¾, 1}, a candidate value of $K_1$ are obtained according to the candidate value of P and the candidate value of α, as shown in table 1 below:

TABLE 1

A schematic table of candidate values of $K_1$

| | P | 2 | 4 | 8 | 12 | 16 | 24 | 32 |
|---|---|---|---|---|---|---|---|---|
| α = 1 | $K_1$ | 2 | 4 | 8 | 12 | 16 | 24 | 32 |
| α = ¾ | | 3/2 | 3 | 6 | 9 | 12 | 18 | 24 |
| α = ½ | | 1 | 2 | 4 | 6 | 8 | 12 | 16 |

In table 1, {1, 3/2, 3, 9} in the candidate values of $K_1$ obviously do not meet selecting a half of ports in one polarization direction and selecting another half of ports in another polarization direction, that is, do not meet the polarization common based mode for selecting ports.

For another scheme of indicating the parameter $K_1$; in the second configuration information, the base station configures the first proportion parameter α to the terminal; where the parameter $K_1$ is equal to: rounding a function value of the product of the number P of the channel state information reference signal ports and the first proportion parameter α, and then multiply the value obtained from the rounding by 2. For example, in the second configuration information, the base station configures the first proportion parameter α to the terminal, where $K_1$ is obtained by: multiplying or dividing the product value of the number P of the channel state information reference signal ports and the parameter α by a constant c, and rounding the value obtained from the multiplying or dividing, and then multiplying the rounding value by 2. For example, in the second configuration information, the base station configures the first proportion parameter α to the terminal, where the parameter $K_1$ is equal to: dividing a product value of the number P of the channel state information reference signal ports and the first proportion parameter α by 2, and rounding the value obtained from the dividing, and then multiplying the rounding value by 2. For example, in the second configuration information, the base station configures the first proportion parameter α to the terminal, where $K_1$ is obtained by: dividing the product value of the number P of the channel state information reference signal ports and the parameter α by 2, and rounding up the value obtained from the dividing, and then multiplying the value obtained from the rounding by 2, i.e., $K_1=\lceil \alpha P/2 \rceil \cdot 2$, where $\lceil \cdot \rceil$ represents rounding up. Candidate values of P being {2, 4, 8, 12, 16, 24, 32}, and candidate values of α being {½, ¾, 1} are taken as an example, candidate values of $K_1$ determined according to $K_1=\lceil \alpha P/2 \rceil \cdot 2$ are shown in table 2:

TABLE 2

A schematic table of candidate values of $K_1$

| | P | 2 | 4 | 8 | 12 | 16 | 24 | 32 |
|---|---|---|---|---|---|---|---|---|
| α = 1 | $K_1$ | 2 | 4 | 8 | 12 | 16 | 24 | 32 |
| α = ¾ | | 2 | 4 | 6 | 10 | 12 | 18 | 24 |
| α = ½ | | 2 | 2 | 4 | 6 | 8 | 12 | 16 |

as shown in table 2, the candidate values of $K_1$ all meet selecting a half of ports in one polarization direction and selecting another half of ports in another polarization direction, that is, meet the polarization common based mode for selecting ports.

For another scheme for indicating the parameter L: in the second configuration information, the base station configures the first proportion parameter α to the terminal; where the parameter L is equal to: rounding a function value of the product of the number P of the channel state information reference signal ports and the parameter α. For example, in the second configuration information, the base station configures the first proportion parameter α to the terminal; where L is obtained by: determining the product value between the number P of the channel state information reference signal ports and the parameter α, and multiplying or dividing the product value by a constant c, and rounding the value obtained from the multiplying or the dividing. For example, in the second configuration information, the base station configures the first proportion parameter α to the terminal; where the parameter L is obtained by: determining the product value between the number P of the channel state information reference signal ports and the parameter α, dividing the product value by 2, and rounding the value obtained from the dividing. For example, in the second configuration information, the base station configures the first proportion parameter α to the terminal; where the parameter L is obtained by: determining the product value of the number P of the channel state information reference signal ports and the parameter α, dividing the product value by 2, and rounding up the value obtained from the dividing. For example, in the second configuration information, the base station configures the first proportion parameter α to the terminal; where the parameter L is equal to: determining the product value of the number P of the channel state information reference signal ports and the parameter α, dividing the product value by 2, and rounding up the value obtained from the dividing; i.e., $L=\lceil \alpha P/2 \rceil$, where $\lceil \cdot \rceil$ represents rounding up. Candidate values of P being {2, 4, 8, 12, 16, 24, 32}, candidate values of c being {½, ¾, 1} are taken as an example, candidate values of L determined according to $L=\lceil \alpha P/2 \rceil$ are shown as follows:

TABLE 3

A schematic table of candidate values of L

| | P | 2 | 4 | 8 | 12 | 16 | 24 | 32 |
|---|---|---|---|---|---|---|---|---|
| α = 1 | L | 1 | 2 | 4 | 6 | 8 | 12 | 16 |
| α = ¾ | | 1 | 2 | 3 | 5 | 6 | 9 | 12 |
| α = ½ | | 1 | 1 | 2 | 3 | 4 | 6 | 8 |

as shown in table 3, the candidate values of L all meet selecting L ports in one polarization direction and selecting other Z ports in another polarization direction, that is, meet the polarization common based mode for selecting ports.

For another scheme for indicating the parameter $K_1$; the second configuration information includes the first proportion parameter α, where $K_1$ is equal to the product of the number P of the channel state information reference signal ports and the parameter α, candidate values of or are determined according to the number P of the channel state information reference signal ports. For example, corresponding to values of P being {8, 16, 24, 32}, the candidate values of α are {1, ¾, ½}; corresponding to values of P being {4, 12}, the candidate values of α are {1, ½}; corresponding to values of P being {4, 12}, the candidate value of α is {1}.

In an embodiment, the second communication node indicates a value of $M_v$ and a value of N by the second configuration information; where N candidate vectors are indicated by the value of N, the N candidate vectors are vectors with continuous index numbers; the $M_v$ vectors are determined from the N candidate vectors.

In an embodiment, the base station indicates for the terminal by the second configuration information, candidate vectors, and the number of vectors included in the second group of vectors participating in combining for the precoding matrix. The base station grasps some information of the downlink channel by the uplink channel and the reciprocity of channels, and determines the candidate vectors, and the number of vectors included in the second group of vectors participating in combining for the precoding matrix; the second group of vectors for combining the precoding matrix is determined from the candidate vectors, which may reduce the amount of operations of the terminal's search to compute vectors for combining the precoding matrix in the case of guaranteeing the performance of the fed back precoding matrix, thereby reducing the complexity of the terminal. A method for indicating the N candidate vectors is to: list the N candidate vectors one by one, or list index numbers of the N candidate vectors one by one. Another method for indicating the N candidate vectors is to: indicate a start vector and an end vector in vectors with continuous index numbers, or indicate a start index number and an end index number of vectors with continuous index numbers. Yet another method for indicating the N candidate vectors is to: indicate a start vector or a start index number of vectors with continuous index numbers, and the number N of the candidate vectors. Yet another method for indicating the N candidate vectors is to: indicate the number N of vectors with continuous index numbers, where the candidate vectors are the vectors with index numbers from 0 to N−1. Because the candidate vectors are the mapping of channel delays, the channel delays are relatively concentrated in accordance with beams, thereby reflecting that the candidate vectors are of continuous index numbers, and further, there is rotatability of the vectors, thus the candidate vectors have a characteristic of continuous index numbers starting from an index number 0, and this method for indicating N candidate vectors uses this characteristic. By using this indicating method, the complexity for indicating the candidate vectors is reduced, and the complexity for determining $M_v$ vectors participating in combining for the precoding matrix from the candidate vectors is reduced. The $M_v$ vectors are determined from the N candidate vectors, i.e., the value of $M_v$ is associated with the value of N, and the second configuration information indicating the value of $M_v$ and the value of N should reflect their association, so as to guarantee the performance of the obtained precoding matrix and reduce the complexity of the system for determining $M_v$ vectors participating in combining for the precoding matrix.

In an embodiment, indicating the value of $M_v$ and the value of N by the second configuration information, includes: including the value of N in the second configuration information, and indicating the value of $M_v$ in accordance with the value of N.

For example, the second configuration information includes: the value of N, and corresponding to the value of N being 1, the value of $M_v$ being 1. For another example, the second configuration information includes: the value of N, and corresponding to the value of N being 2, the value of $M_v$, being 2. It should be noted that, if the value of N is 2, the value of $M_v$ can be 1, but it is not necessary that the value of $M_v$ can be 1. Due to the rotatability of the vectors, the base station may determine the first vector in the candidate vectors to be a vector in the $M_v$ vectors, and then corresponding to the value of N being 2, it becomes meaningless that the value of $M_v$ is 1. Therefore, corresponding to the value of N being 2, the value of $M_v$ being 2, may simplify the indication of the system to the value of $M_v$, and simplify the complexity of the terminal for determining $M_v$ vectors. For another example, the second configuration information includes: the value of N, and corresponding to the value of N being greater than 2, the value of $M_v$ being 2. Since the base station may transmit a channel state information reference signal for processing a frequency domain characteristic, corresponding to the value of N being greater than 2, the value of $M_v$ being greater than 2 has no gain for the performance of the system, and increases the complexity of the system; therefore, corresponding to the value of N being greater than 2, the value of $M_v$ being 2, may guarantee the system performance and may reduce the complexity of the system.

In an embodiment, indicating the value of $M_v$ in accordance with the value of N, includes one of:

- corresponding to the value of N being 1, the value of $M_v$ being 1;
- corresponding to the value of N being 2, the value of $M_v$ being 2;
- corresponding to the value of N being greater than 2, the value of $M_v$ being 2.

In an embodiment, indicating the value of $M_v$ and the value of N by the second configuration information, includes: including the value of $M_v$ in the second configuration information, and indicating the value of N in accordance with the value of $M_v$.

For example, the second configuration information includes: the value of $M_v$, and corresponding to the value of $M_v$ being 1, the value of N being 1. For another example, the second configuration information includes: the value of $M_v$, and corresponding to the value of $M_v$ being 2, the value of N being greater than or equal to 2.

In an embodiment, indicating the value of N in accordance with the value of $M_v$, includes one of:

corresponding to the value of $M_v$ being 1, the value of N being 1;

corresponding to the value of $M_v$ being 2, the value of N being equal to or greater than 2;

corresponding to the value of $M_v$ being 2, selecting a value from $\{2, N_i\}$ as the value of N; where $N_i$ is a value in $\{3, 4, 5\}$.

In an embodiment, indicating the value of $M_v$ and the value of N by the second configuration information, includes: including a combination parameter in the second configuration information, and indicating the value of $M_v$ and the value of N in accordance with the combination parameter.

In an embodiment, the value of $M_v$ and the value of N are indicated by using the combination parameter, i.e., the value of $M_v$ and the value of N are indicated by using one parameter.

A scheme of using the combination parameter to indicate the value of $M_v$ and the value of N is that: a candidate value of the combination parameter 1 indicates a value of $M_v$ and a value of N. For example, the combination parameter 1 with a value 0, indicates N being 1, and $M_v$ being 1. For another example, the combination parameter 1 with a value 1, indicates N being 2, and $M_v$ being 2. For another example, the combination parameter 1 with a value 2, indicates N being $N_i$, and $M_v$ being 2; where $N_i$ is a value in $\{3, 4, 5\}$. As shown in table 4.

TABLE 4

A table of mapping relationship between the combination parameter 1 and N as well as $M_v$

| Combination parameter 1 | N | $M_v$ |
|---|---|---|
| 0 | 1 | 1 |
| 1 | 2 | 2 |
| 2 | $N_i$ | 2 |

Another scheme of using the combination parameter to indicate the value of $M_v$ and the value of N is that: a value of the combination parameter 2 indicates a value of α, a value of $M_v$, a value of β, and a value of N; where the first configuration information includes the number P of channel state information reference signal ports, the terminal selects $K_1$ ports from the P channel state information reference signal ports, where L ports are selected in each polarization direction, $K_1$=2L; each of the L ports is mapped to a vector in the first group of vectors; the second configuration information includes a parameter α, where $K_1$ is equal to a product of the number P of channel state information reference signal ports and the parameter α As shown in table 5.

TABLE 5

A table of mapping relationship between the combination parameter 2, α, $M_v$, β and N

| Combination parameter 2 | α | $M_v$ | β | N |
|---|---|---|---|---|
| 0 | ½ | 1 | ½ | 1 |
| 1 | ½ | 1 | ¾ | 1 |
| 2 | ½ | 1 | 1 | 1 |
| 3 | ¾ | 1 | ½ | 1 |
| 4 | ¾ | 1 | ¾ | 1 |

TABLE 5-continued

A table of mapping relationship between the combination parameter 2, α, $M_v$, β and N

| Combination parameter 2 | α | $M_v$ | β | N |
|---|---|---|---|---|
| 5 | ¾ | 1 | 1 | 1 |
| 6 | 1 | 1 | ½ | 1 |
| 7 | 1 | 1 | ¾ | 1 |
| 8 | 1 | 1 | 1 | 1 |
| 9 | ½ | 2 | ½ | 2 |
| 10 | ½ | 2 | ¾ | 2 |
| 11 | ½ | 2 | 1 | 2 |
| 12 | ¾ | 2 | ½ | 2 |
| 13 | ¾ | 2 | ¾ | 2 |
| 14 | ¾ | 2 | 1 | 2 |
| 15 | 1 | 2 | ½ | 2 |
| 16 | 1 | 2 | ¾ | 2 |
| 17 | 1 | 2 | 1 | 2 |
| 18 | ½ | 2 | ½ | Ni |
| 19 | ½ | 2 | ¾ | Ni |
| 20 | ½ | 2 | 1 | Ni |
| 21 | ¾ | 2 | ½ | Ni |
| 22 | ¾ | 2 | ¾ | Ni |
| 23 | ¾ | 2 | 1 | Ni |
| 24 | 1 | 2 | ½ | Ni |
| 25 | 1 | 2 | ¾ | Ni |
| 26 | 1 | 2 | 1 | Ni |

In an embodiment, reporting the channel state information according to the channel state information reference signal and the second configuration information, includes: determining a reporting case of a vector in the second group of vectors by the first communication node, according to the value of $M_v$ and the value of N; or determining a reporting case of a vector in the second group of vectors by the first communication node for a vector, according to the value of N.

In an embodiment, whether the terminal reports a vector in the second group of vectors to the base station is determined according to the value of $M_v$ and the value of N.

For example, corresponding to $M_v$ being equal to N, the terminal does not report a vector in the second group of vectors to the base station. For example, corresponding to $M_v$ being not equal to N, the terminal reports a vector in the second group of vectors to the base station. For example, corresponding to $M_v$ being 1 and N being 1, the terminal does not report a vector in the second group of vectors to the base station. For example, corresponding to $M_v$ being 2 and N being 2, the terminal does not report a vector in the second group of vectors to the base station. For example, corresponding to $M_v$ being 2 and N being greater than 2, the terminal reports a vector in the second group of vectors to the base station.

In some cases, the second group of vectors participating in combining for the precoding matrix may be determined according to the value of $M_v$ and the value of N, without the need for the terminal to report the second group of vectors participating in combining for the precoding matrix to the base station, thereby saving the resource overhead of the reporting; in other cases, the second group of vectors participating in combining for the precoding matrix cannot be determined only according to the value of $M_v$ and the value of N, and the terminal is required to report the second group of vectors participating in combining for the precoding matrix to the base station. Therefore, determining whether the terminal reports a vector in the second group of vectors to the base station according to the value of $M_v$ and the value of N, may ensure that the base station knows the second group of vectors participating in combining for the precoding matrix, and further save the resource overhead for the reporting.

In an embodiment, determining the reporting case of a vector in the second group of vectors by the first communication node, according to the value of $M_v$ and the value of N, includes:

- corresponding to $M_v$ being equal to N, not reporting, by the first communication node, a vector in the second group of vectors to the second communication node;
- corresponding to $M_v$ being not equal to N, reporting, by the first communication node, a vector in the second group of vectors to the second communication node.

In an embodiment, determining of the reporting case of a vector in the second group of vectors by the first communication node, according to the value of N, includes one of:

- corresponding to the value of N being $N_i$, reporting, by the first communication node, a vector in the second group of vectors to the second communication node;
- corresponding to the value of N being less than $N_i$, not reporting, by the first communication node, a vector in the second group of vectors to the second communication node; where $N_i$ is a value in {3, 4, 5};
- corresponding to the value of N being greater than 2, reporting, by the first communication node, a vector in the second group of vectors to the second communication node;
- corresponding to the value of N being less than or equal to 2, not reporting, by the first communication node, a vector in the second group of vectors to the second communication node.

In an embodiment, reporting the second group of vectors to the second communication node by the first communication node, includes: reporting an interval between index numbers corresponding to the $M_v$ vectors, to the second communication node by the first communication node.

In an embodiment, reporting the second group of vectors to the base station by the terminal, includes: reporting an interval between index numbers corresponding to the $M_v$ vectors.

A scheme is that, the terminal reports a starting vector of the $M_v$ vectors and an interval between index numbers of the $M_v$ vectors to the base station, then the terminal reports to the base station that the second group of vectors is $M_v$ vectors in total at every interval from the starting vector in the N vectors. For example, the N vectors with continuous index numbers are {vector 2, vector 3, vector 4, vector 5}, where N is 4; the terminal reports a $1^{st}$ vector in the N vectors to be the starting vector of the $M_v$ vectors, i.e., the starting vector of the $M_v$ vectors to be the vector 3, and reports the interval between the index numbers of the $M_v$ vectors to be 2, i.e., the reported $M_v$ vector to be {vector 3, vector 5}; where the first vector in the N vectors is the vector 2, the value of $M_v$ is 2.

A scheme is that, the terminal reports an interval between index numbers of the $M_v$ vector to the base station, then the terminal reports to the base station that the second group of vectors is $M_v$ vectors in total at every interval from the first vector in the N vectors. For example, for $M_v$ being 2 and N being 4, the terminal reports to the base station that the interval between index numbers of the $M_v$ vectors is T, the N candidate vectors with continuous index numbers is {vector 0, vector 1, vector 2, and vector 3}, then the reported second group of vectors is {vector 0, vector T}. Herein, the interval between the index numbers is a difference between the index numbers.

In an embodiment, reporting the second group of vectors to the second communication node by the first communication node, includes: corresponding to $M_v$ being 2 and N being greater than $M_v$, reporting an index number of one vector to the second communication node by the first communication node, and where an index number of another vector is a predetermined value.

In an embodiment, reporting the second group of vectors to the second communication node by the first communication node, includes: reporting the second group of vectors by using $\lceil \log_2(N-1) \rceil$ bits.

The terminal transmits a sounding reference signal (SRS), the base station receives the sounding reference signal to obtain uplink channel state information, and the base station schedules, according to the uplink channel state information, the terminal to transmit data by using a transmitting antenna corresponding to transmitting the sounding reference signal and by a way matched with the channel state information, so as to improve the efficiency of data transmission. In order to improve the stability of data transmission and improve the efficiency of data transmission, the terminal uses multiple transmitting antennas. In some cases, the transmitting antennas of the terminal are limited by a number of allowable-used other transmitting units matched with the transmitting antennas, and all of the transmitting antennas cannot be used simultaneously to transmit the signal. The terminal transmits the sounding reference signal by switching to use different transmitting antennas, which enables the base station to obtain the uplink channel state information corresponding to the different transmitting antennas. An antenna switching case occurs within a sounding signal resource set: the sounding signal resource set includes multiple sounding signal resources, different sounding signal resources use different transmitting antennas; where there is a guard time interval between different sounding signal resources, so as to ensure different antennas to be switched successfully; the guard time interval is implemented by configuring a starting OFDM symbol of a sounding signal resource in the set in a slot and a number of OFDM symbols occupied by the sounding signal resource. In order to switch the antennas flexibly to improve the using efficiency of resources, it is also required that the antenna switching occurs between sounding signal resource sets; the antenna switching occurs between sounding signal resource sets, so a guard interval is required between resources of two sets. The antenna switching occurs within the sounding signal resource set, resources of the sounding signal resource set are only within a same slot; and the antenna switching occurs between the sounding signal resource sets, and resources of the two sets are located within different slots respectively. Therefore, guaranteeing a guard interval between two sets is an issue to be solved.

In view of this, an implementation method for transmitting an SRS is proposed in the present disclosure, so as to guarantee a guard interval between two sets.

In an embodiment, an implementation method for transmitting a sounding reference signal, includes:

- receiving, by a terminal, configuration information about an uplink reference signal of a base station; and
- transmitting, by the terminal, the uplink reference signal according to the configuration information.

In an embodiment, the configuration information includes a usage of a sounding signal resource set; where for the sounding signal resource set with the usage of antenna switching being not transmitted on first N OFDM symbols within a slot, the N is determined by one of the following ways:

N being configured by the base station;

N being specified by a protocol;

a minimum value of N being specified by a protocol; and a minimum value of N being determined by an ability of the terminal.

In an embodiment, the configuration information includes a usage of the sounding signal resource set; where for the sounding signal resource set with the usage of antenna switching being not transmitted on last N OFDM symbols within a slot, the N is determined by one of the following ways:

N being configured by the base station;

N being specified by a protocol;

a minimum value of N being specified by a protocol; and a minimum value of N being determined by an ability of the terminal.

In an embodiment, the configuration information includes a usage of the sounding signal resource set; where for the sounding signal resource set with the usage of antenna switching, other sounding signal resource sets are not transmitted on last N OFDM symbols of the sounding signal resource set, the N is determined by one of the following ways:

N being configured by the base station;

N being specified by a protocol;

a minimum value of N being specified by a protocol; and a minimum value of N being determined by an ability of the terminal.

In an embodiment, the configuration information includes a usage of the sounding signal resource set; where for the sounding signal resource set with the usage of antenna switching, other sounding signal resource sets are not transmitted on first N OFDM symbols of the sounding signal resource set, the N is determined by one of the following ways:

N being configured by the base station;

N being specified by a protocol;

a minimum value of N being specified by a protocol; and a minimum value of N being determined by an ability of the terminal.

In the embodiments, the terminal transmits the SRS, the base station receives the sounding reference signal to obtain the uplink channel state information, and the base station schedules, according to the uplink channel state information, the terminal to transmit data by using a transmitting antenna corresponding to transmitting the sounding reference signal and by a way matched with the channel state information, so as to improve the efficiency of data transmission. In one case, the terminal may transmit the sounding reference signals by using one port; in another case, the terminal may transmit the sounding reference signals by using multiple ports respectively. In one case, one terminal may transmit the sounding reference signals; in another case, multiple terminals transmit the sounding reference signals. In order to map multiple sounding reference signals, and to avoid interference between the multiple sounding reference signals, on the one hand, different sounding reference signals are mapped to subcarriers with different transmission comb offset values, and on the other hand, different sounding reference signals with a same transmission comb offset value are configured with different phase rotation biases. That is, the increasing of the transmission comb number may support the transmission of more sounding reference signals; meanwhile, with the increasing of the transmission comb number, the number of subcarriers for mapping the sounding reference signals on the same bandwidth decreases, and a sequence of the sounding reference signals able to be mapped becomes shorter. Illustratively, a transmission technology between the transmission comb number and ports of the sounding reference signals may include: a sounding reference signal transmitting technology of supporting 1, 2, 4 ports and the transmission comb number being 2, 4, and a sounding reference signal transmitting technology of supporting 1 port and the transmission comb number being 8. However, the existing sounding reference signal transmitting technology is used to implement the sounding reference signal transmission with 4 ports and the transmission comb number being 8, which leads to the problem of non-orthogonal port signals, thereby introducing the interference between the ports; and a phase rotation offset of the sounding reference signals on the ports is not in a preset phase rotation offset position, thereby increasing the complexity of the system.

In an embodiment, an implementation method for transmitting a sounding reference signal, includes:

receiving, by a terminal, configuration information about an uplink reference signal of a base station; and transmitting, by the terminal, the uplink reference signal according to the configuration information.

In an embodiment, the configuration information includes: a transmission comb number, a transmission comb offset value, and a rotation offset starting number, where a rotation offset interval between ports is a rounding value of a quotient of a maximum rotation offset number divided by the number of sounding reference signal resource ports; a rotation offset number on the sounding reference signal resource port is determined according to the rotation offset starting number, the rotation offset interval between the ports, and a sounding reference signal resource port index number.

The rotation offset interval between ports is a rounding value of a quotient of a maximum rotation offset number divided by the number of sounding reference signal resource ports, where one way is that the rounding value is a rounding down value; and another way is that the rounding value is a rounding up value.

For example:

$$n_{SRS}^{cs,i} = \left[ n_{SRS}^{cs} + \left\lfloor \frac{n_{SRS}^{cs,max}}{N_{ap}^{SRS}} \right\rfloor (p_i - 1000) \right] \text{mod} n_{SRS}^{cs,max};$$

where $$n_{SRS}^{CS}$$

represents a rotation offset starting number, $$n_{SRS}^{CS,max}$$

represents a maximum rotation offset number, $$N_{ap}^{SRS}$$

represents a number of sounding reference signal resource ports, and $$\left\lfloor \frac{n_{SRS}^{CS,max}}{N_{ap}^{SRS}} \right\rfloor$$

represents that a rotation offset interval between the ports is a rounding value of a quotient of the maximum rotation offset number divided by the number of sounding reference signal resource ports, where the rounding value is a rounding down value; $p_i$ represents a sounding reference signal resource port index number, $$n_{SRS}^{cs,i}$$

represents a rotation offset number on the sounding reference signal resource port. Herein, the rounding down value may enable that the rotation offset numbers on the reference signal resource ports do not overlap in the case where the transmission comb number is 8, the maximum rotation offset number is 6, and the number of sounding reference signal resource ports is 4.

For example:

$$n_{SRS}^{cs,i} = \left[ n_{SRS}^{cs} + 2\left\lceil \frac{n_{SRS}^{cs,max}}{N_{ap}^{SRS}} \right\rceil (p_i - 1000) \right] \mathrm{mod}\, n_{SRS}^{cs,max};$$

where $$n_{SRS}^{CS}$$

represents a rotation offset starting number, $$n_{SRS}^{CS,max}$$

represents a maximum rotation offset number, $$N_{ap}^{SRS}$$

represents a number of sounding reference signal resource ports, and $$\left\lceil \frac{n_{SRS}^{cs,max}}{N_{ap}^{SRS}} \right\rceil$$

represents that the rotation offset interval between the ports is a rounding value of a quotient of the maximum rotation offset number divided by the number of sounding reference signal resource ports, where the rounding value is a rounding up value; $p_i$ represents a sounding reference signal resource port index number, $$n_{SRS}^{cs,i}$$

represents a rotation offset number on the sounding reference signal resource port. Herein, the rounding up value may enable that an interval between the rotation offset numbers on the reference signal resource ports increases in the case where the transmission comb number is 8, the maximum rotation offset number is 6, and the number of sounding reference signal resource ports is 4.

In an embodiment, the configuration information includes the transmission comb number, the transmission comb offset value, and the rotation offset starting number, where the rotation offset interval between ports is an integer multiple of a rounding value of a quotient of the maximum rotation offset number divided by the number of sounding reference signal resource ports; a rotation offset number on the sounding reference signal resource port is determined according to the rotation offset starting number, the rotation offset interval between the ports, and a sounding reference signal resource port index number.

The rotation offset interval between the ports is an integer multiple of a rounding value of a quotient of the maximum rotation offset number divided by the number of sounding reference signal resource ports, where one way is that the rounding value is a rounding down value; and another way is that the rounding value is a rounding up value.

For example:

$$n_{SRS}^{cs,i} = \left[ n_{SRS}^{cs} + 2\left\lfloor \frac{n_{SRS}^{cs,max}}{N_{ap}^{SRS}} \right\rfloor (p_i - 1000) \right] \mathrm{mod}\, n_{SRS}^{cs,max};$$

where $$n_{SRS}^{CS}$$

represents a rotation offset starting number, $$n_{SRS}^{CS}$$

represents a maximum rotation offset number, $$N_{ap}^{SRS}$$

represents a number of sounding reference signal resource ports, and $$2\left\lfloor \frac{n_{SRS}^{cs,max}}{N_{ap}^{SRS}} \right\rfloor$$

represents that the rotation offset interval between ports is 2 times of a rounding value of a quotient of the maximum rotation offset number divided by the number of sounding reference signal resource ports, where the rounding value is a rounding down value; $p_i$ represents a sounding reference signal resource port index number, $$n_{SRS}^{cs,i}$$

represents a rotation offset number on the sounding reference signal resource port.

For example:

$$n_{SRS}^{cs,i} = \left[n_{SRS}^{cs} + 2\left\lceil\frac{n_{SRS}^{cs,max}}{N_{ap}^{SRS}}\right\rceil(p_i - 1000)\right] \bmod n_{SRS}^{cs,max};$$

where $$n_{SRS}^{CS}$$

represents a rotation offset starting number, $$n_{SRS}^{CS,max}$$

represents a maximum rotation offset number, $$N_{ap}^{SRS}$$

represents a number of sounding reference signal resource ports, and $$2\left\lceil\frac{n_{SRS}^{cs,max}}{N_{ap}^{SRS}}\right\rceil$$

represents that the rotation offset interval between the ports is 2 times of a rounding value of a quotient of the maximum rotation offset number divided by the number of sounding reference signal resource ports, where the rounding value is a rounding up value; $p_i$ represents the sounding reference signal resource port index number, $$n_{SRS}^{cs,i}$$

represents the rotation offset number on the sounding reference signal resource port.

In an embodiment, the configuration information includes a transmission comb number, a transmission comb offset value, and a rotation offset starting number, where a rotation offset interval between ports is a rounding down value of a quotient of a maximum rotation offset number divided by the number of sounding reference signal resource ports; a rotation offset number on the sounding reference signal resource port is determined according to the rotation offset starting number, the rotation offset interval between the ports, and a sounding reference signal resource port index number; where the transmission comb offset values of all ports of the sounding reference signal resource are the same, and are the transmission comb offset value included in the configuration information.

For example:

$$n_{SRS}^{cs,i} = \left[n_{SRS}^{cs} + \left\lfloor\frac{n_{SRS}^{cs,max}}{N_{ap}^{SRS}}\right\rfloor(p_i - 1000)\right] \bmod n_{SRS}^{cs,max};$$

$$k_{TC}^{(p_i)} = \bar{k}_{TC}$$

where $$n_{SRS}^{CS}$$

represents a rotation offset starting number, $$n_{SRS}^{CS,max}$$

represents a maximum rotation offset number, $$N_{ap}^{SRS}$$

represents a number of sounding reference signal resource ports, and $$\left\lfloor\frac{n_{SRS}^{CS,max}}{N_{ap}^{SRS}}\right\rfloor$$

represents that the rotation offset interval between the ports is a rounding value of a quotient of the maximum rotation offset number divided by the number of sounding reference signal resource ports, where the rounding value is a rounding down value; $p_i$ represents a sounding reference signal resource port index number, $$n_{SRS}^{cs,i}$$

represents a rotation offset number on the sounding reference signal resource port; $\bar{k}_{TC}$ represents a transmission comb offset value included in the configuration information, $$k_{TC}^{(p_i)}$$

represents a transmission comb offset value of the port of the sounding reference signal resource, the rounding down value may enable that the rotation offset numbers on the reference signal resource ports do not overlap in the case where the transmission comb number is 8, the maximum rotation offset number is 6, and the number of sounding reference signal resource ports is 4.

In an embodiment, the configuration information includes a transmission comb number, a transmission comb offset value, and a rotation offset starting number, where a rotation offset interval between ports is a rounding down value of a quotient of a maximum rotation offset number divided by the number of sounding reference signal resource ports; a rotation offset number on the sounding reference signal resource port is determined according to the rotation offset starting number, the rotation offset interval between ports, and a sounding reference signal resource port index number; where the transmission comb offset value of a first group of ports of the sounding reference signal resource is the transmission comb offset value included in the configuration information, the transmission comb offset value of a second group of ports differs from the transmission comb offset value of the first group of ports by a half of the transmission comb number.

For example:

$$n_{SRS}^{cs,i} = \left[n_{SRS}^{cs} + \left\lfloor\frac{n_{SRS}^{cs,max}}{N_{ap}^{SRS}}\right\rfloor(p_i - 1000)\right]\mathrm{mod}\, n_{SRS}^{cs,max};$$

$$k_{TC}^{(p_i)} = \begin{cases}(\bar{k}_{TC} + K_{TC}/2)\mathrm{mod}K_{TC} & \text{if } p_i \in \{1000, 1001\}(\text{or } p_i \in \{1002, 1003\}) \\ \bar{k}_{TC} & \text{else}\end{cases}$$

where $$n_{SRS}^{CS}$$

represents a rotation offset starting number, $$n_{SRS}^{CS,max}$$

represents a maximum rotation offset number, $$N_{ap}^{SRS}$$

represents a number of sounding reference signal resource ports, and $$\left\lfloor\frac{n_{SRS}^{CS,max}}{N_{ap}^{SRS}}\right\rfloor$$

represents that the rotation offset interval between the ports is a rounding value of a quotient of the maximum rotation offset number divided by the number of sounding reference signal resource ports, where the rounding value is a rounding down value; $p_i$ represents a sounding reference signal resource port index number, $$n_{SRS}^{cs,i}$$

represents a rotation offset number on the sounding reference signal resource port; $\bar{k}_{TC}$ represents a transmission comb offset value included in the configuration information, $$k_{TC}^{(p_i)}$$

represents a transmission comb offset value of the port of the sounding reference signal resource. The transmission comb offset value of a group of ports $p_i \in \{1002, 1003\}$ thereof is the transmission comb offset value included in the configuration information, and the transmission comb offset value of another group of ports $p_i \in \{1000, 1001\}$ differs from the transmission comb offset value of $p_i \in \{1002, 1003\}$ by a half of the transmission comb number. Or, the transmission comb offset value of a group of ports $p_i \in \{1000, 1001\}$ thereof is the transmission comb offset value included in the configuration information, and the transmission comb offset value of another group of ports $p_i \in \{1002, 1003\}$ differs from the transmission comb offset value of $p_i \in \{1000, 1001\}$ by a half of the transmission comb number.

For example:

$$n_{SRS}^{cs,i} = \left[n_{SRS}^{cs} + \left\lfloor\frac{n_{SRS}^{cs,max}}{N_{ap}^{SRS}}\right\rfloor(p_i - 1000)\right]\mathrm{mod}\, n_{SRS}^{cs,max};$$

$$k_{TC}^{(p_i)} = \begin{cases}(\bar{k}_{TC} + K_{TC}/2)\mathrm{mod}K_{TC} & \text{if } p_i \in \{1000, 1002\}(\text{or } p_i \in \{1001, 1003\}) \\ \bar{k}_{TC} & \text{else}\end{cases}$$

where $$n_{SRS}^{CS}$$

represents a rotation offset starting number, $$n_{SRS}^{CS,max}$$

represents a maximum rotation offset number, $$N_{ap}^{SRS}$$

represents a number of sounding reference signal resource ports, and $$\left\lfloor\frac{n_{SRS}^{CS,max}}{N_{ap}^{SRS}}\right\rfloor$$

represents that the rotation offset interval between the ports is a rounding value of a quotient of the maximum rotation offset number divided by the number of sounding reference signal resource ports, where the rounding value is a rounding down value; $p_i$ represents a sounding reference signal resource port index number, $$n_{SRS}^{cs,i}$$

represents a rotation offset number on the sounding reference signal resource port; $\bar{k}_{TC}$ represents the transmission comb offset value included in the configuration information, $$k_{TC}^{(p_i)}$$

represents a transmission comb offset value of the port of the sounding reference signal resource. The transmission comb offset value of a group of ports $p_i \in \{1000, 1002\}$ thereof is the transmission comb offset value included in the configuration information, and the transmission comb offset value of another group of ports $p_i \in \{1001, 1003\}$ differs from the transmission comb offset value of $p_i \in \{1000, 1002\}$ by a half of the transmission comb number. Or, the transmission comb offset value of a group of ports $p_i \in \{1001, 1003\}$ thereof is the transmission comb offset value included in the configuration information, and the transmission comb offset value of another group of ports $p_i \in \{1000, 1002\}$ differs from the transmission comb offset value of $p_i \in \{1001, 1003\}$ by a half of the transmission comb number.

In an embodiment, the configuration information includes a transmission comb number, a transmission comb offset value, and a rotation offset starting number, where a rotation offset interval between ports is 2 times of a rounding down value of a quotient of a maximum rotation offset number divided by the number of sounding reference signal resource ports; a rotation offset number on the sounding reference signal resource port is determined according to the rotation offset starting number, the rotation offset interval between the ports, and a sounding reference signal resource port index number; where the transmission comb offset value of a first group of ports of the sounding reference signal resource is the transmission comb offset value included in the configuration information, and the transmission comb offset value of a second group of ports differs from the transmission comb offset value of the first group of ports by a half of the transmission comb number.

For example:

$$n_{SRS}^{cs,i} = \left[n_{SRS}^{cs} + 2\left\lfloor\frac{n_{SRS}^{cs,max}}{N_{ap}^{SRS}}\right\rfloor(p_i - 1000)\right]\bmod n_{SRS}^{cs,max};$$

$$k_{TC}^{(p_i)} = \begin{cases} (\bar{k}_{TC} + K_{TC}/2)\bmod K_{TC} & \text{if } p_i \in \{1000, 1001\} (\text{or } p_i \in \{1002, 1003\}) \\ \bar{k}_{TC} & \text{else} \end{cases}$$

where $$n_{SRS}^{CS}$$

represents a rotation offset starting number, $$n_{SRS}^{CS,max}$$

represents a maximum rotation offset number, $$N_{ap}^{SRS}$$

represents a number of sounding reference signal resource ports, and $$2\left\lfloor\frac{n_{SRS}^{cs,max}}{N_{ap}^{SRS}}\right\rfloor$$

represents that the rotation offset interval between the ports is 2 times of a rounding value of a quotient of the maximum rotation offset number divided by the number of sounding reference signal resource ports, where the rounding value is a rounding down value; $p_i$ represents a sounding reference signal resource port index number, $$n_{SRS}^{cs,i}$$

represents a rotation offset number on the sounding reference signal resource port; $\bar{k}_{TC}$ represents a transmission comb offset value included in the configuration information, $$k_{TC}^{(p_i)}$$

represents a transmission comb offset value of the port of the sounding reference signal resource. The transmission comb offset value of a group of ports $p_i \in \{1002, 1003\}$ thereof is the transmission comb offset value included in the configuration information, and the transmission comb offset value of another group of ports $p_i \in \{1000, 1001\}$ differs from the transmission comb offset value of $p_i \in \{1002, 1003\}$ by a half of the transmission comb number. Or, the transmission comb offset value of a group of ports $p_i \in \{1000, 1001\}$ thereof is the transmission comb offset value included in the configuration information, and the transmission comb offset value of another group of ports $p_i \in \{1002, 1003\}$ differs from the transmission comb offset value of $p_i \in \{1000, 1001\}$ by a half of the transmission comb number.

For example:

$$n_{SRS}^{cs,i} = \left[n_{SRS}^{cs} + 2\left\lfloor\frac{n_{SRS}^{cs,max}}{N_{ap}^{SRS}}\right\rfloor(p_i - 1000)\right]\bmod n_{SRS}^{cs,max};$$

$$k_{TC}^{(p_i)} = \begin{cases} (\bar{k}_{TC} + K_{TC}/2)\bmod K_{TC} & \text{if } p_i \in \{1000, 1002\} (\text{or } p_i \in \{1001, 1003\}) \\ \bar{k}_{TC} & \text{else} \end{cases}$$

where $$n_{SRS}^{CS}$$

represents a rotation offset starting number, $$n_{SRS}^{CS,max}$$

represents a maximum rotation offset number, $$N_{ap}^{SRS}$$

represents a number of sounding reference signal resource ports, and $$2\left\lfloor \frac{n_{SRS}^{cs,max}}{N_{ap}^{SRS}} \right\rfloor$$

represents that the rotation offset interval between the ports is 2 times of a rounding value of a quotient of the maximum rotation offset number divided by the number of sounding reference signal resource ports, where the rounding value is a rounding down value; $p_i$ represents a sounding reference signal resource port index number, $$n_{SRS}^{cs,i}$$

represents a rotation offset number on the sounding reference signal resource port; $\bar{k}_{TC}$ represents a transmission comb offset value included in the configuration information, $$k_{TC}^{(p_i)}$$

represents a transmission comb offset value of the port of the sounding reference signal resource. The transmission comb offset value of a group of ports $p_i \in \{1000, 1002\}$ thereof is the transmission comb offset value included in the configuration information, and the transmission comb offset value of another group of ports $p_i \in \{1001, 1003\}$ differs from the transmission comb offset value of $p_i \in \{1000, 1002\}$ by a half of the transmission comb number. Or, the transmission comb offset value of a group of ports $p_i \in \{1001, 1003\}$ thereof is the transmission comb offset value included in the configuration information, and the transmission comb offset value of another group of ports $p_i \in \{1000, 1002\}$ differs from the transmission comb offset value of $p_i \in \{1001, 1003\}$ by a half of the transmission comb number.

In an embodiment, the configuration information includes a transmission comb number, a transmission comb offset value, and a rotation offset starting number, where a rotation offset interval between ports is a rounding down value of a quotient of a maximum rotation offset number divided by the number of sounding reference signal resource ports; a rotation offset number on the sounding reference signal resource port is determined according to the rotation offset starting number, the rotation offset interval between the ports, and a sounding reference signal resource port index number; and whether the sounding reference signal resource port uses the same transmission comb offset value is determined according to whether the rotation offset starting number is located in a determined set.

For example:

$$n_{SRS}^{cs,i} = \left[ n_{SRS}^{cs} + \left\lfloor \frac{n_{SRS}^{cs,max}}{N_{ap}^{SRS}} \right\rfloor (p_i - 1000) \right] \bmod n_{SRS}^{cs,max};$$

$$k_{TC}^{(p_i)} = \begin{cases} (\bar{k}_{TC} + K_{TC}/2) \bmod K_{TC} & \text{if } n_{SRS}^{CS} \in \{n_{SRS}^{CS,max}/2,\ n_{SRS}^{CS,max}/2 + 1, \ldots, n_{SRS}^{CS,max} - 1\} \text{ and, } p_i \in \{1001, 1003\} \\ \bar{k}_{TC} & \text{else} \end{cases}$$

where $$n_{SRS}^{CS}$$

represents a rotation offset starting number, $$n_{SRS}^{CS,max}$$

represents a maximum rotation offset number, $$N_{ap}^{SRS}$$

represents a number of sounding reference signal resource ports, and $$\left\lfloor \frac{n_{SRS}^{CS,max}}{N_{ap}^{SRS}} \right\rfloor$$

represents that the rotation offset interval between the ports is a rounding value of a quotient of the maximum rotation offset number divided by the number of sounding reference signal resource ports, where the rounding value is a rounding down value; $p_i$ represents a sounding reference signal resource port index number, $$n_{SRS}^{cs,i}$$

represents a rotation offset number on the sounding reference signal resource port; $\bar{k}_{TC}$ represents a transmission comb offset value included in the configuration information, $$k_{TC}^{(p_i)}$$

represents a transmission comb offset value of the port of the sounding reference signal resource; corresponding to the rotation offset starting number $$n_{SRS}^{CS} \in \{n_{SRS}^{CS,max}/2,\ n_{SRS}^{CS,max}/2 + 1, \ldots, n_{SRS}^{CS,max} - 1\},$$

where the transmission comb offset value of a group of ports $p_i \in \{1000, 1002\}$ is the transmission comb offset value included in the configuration information, and the transmission comb offset value of another group of ports $p_i \in \{1001, 1003\}$ differs from the transmission comb offset value of $p_i \in \{1000, 1002\}$ by a half of the transmission comb number; corresponding to the rotation offset starting number $$n_{SRS}^{CS} \notin \{n_{SRS}^{CS,max}/2, n_{SRS}^{CS,max}/2+1, \ldots , n_{SRS}^{CS,max}-1\},$$

the transmission comb offset values of all ports is the transmission comb offset value included in the configuration information.

$$k_{TC}^{(p_i)} = \begin{cases} (\bar{k}_{TC}+K_{TC}/2)\bmod K_{TC} & \text{if } n_{SRS}^{CS} \notin \{n_{SRS}^{CS,max}/2, n_{SRS}^{CS,max}/2+1, \ldots , n_{SRS}^{CS,max}-1\} \text{ and } p_i \in \{1001, 1003\}. \\ \bar{k}_{TC} & \text{else} \end{cases}$$

In an embodiment, the configuration information includes a transmission comb number, a first transmission comb offset value, a second transmission comb offset value, and a rotation offset starting number, where a rotation offset interval between ports is a rounding down value of a quotient of a maximum rotation offset number divided by the number of sounding reference signal resource ports; a rotation offset number on the sounding reference signal resource port is determined according to the rotation offset starting number, the rotation offset interval between the ports, and a sounding reference signal resource port index number; where the transmission comb offset value of a first group of ports of the sounding reference signal resource is the first transmission comb offset value, and the transmission comb offset value of a second group of ports is the second transmission comb offset value.

In an embodiment, the configuration information includes a transmission comb number, a first transmission comb offset value, a second transmission comb offset value, and a rotation offset starting number, where a rotation offset interval between ports is an integer multiple of a rounding down value of a quotient of a maximum rotation offset number divided by the number of sounding reference signal resource ports; a rotation offset number on the sounding reference signal resource port is determined according to the rotation offset starting number, the rotation offset interval between the ports, and a sounding reference signal resource port index number; where the transmission comb offset value of a first group of ports of the sounding reference signal resource is the first transmission comb offset value, and the transmission comb offset value of a second group of ports is the second transmission comb offset value.

In an embodiment, the configuration information includes a transmission comb number, a first transmission comb offset value, a second transmission comb offset value, and a rotation offset starting number, where the transmission comb offset value of a first group of ports of the sounding reference signal resource is the first transmission comb offset value, the rotation offset interval between the first group of ports is a half of the maximum rotation offset number, and the transmission comb offset value of a second group of ports is the second transmission comb offset value, the rotation offset interval between the second group of ports is a half of the maximum rotation offset number; a rotation offset number on the sounding reference signal resource port is determined according to the rotation offset starting number, the rotation offset interval between the ports, and a sounding reference signal resource port index number.

Figure 2:
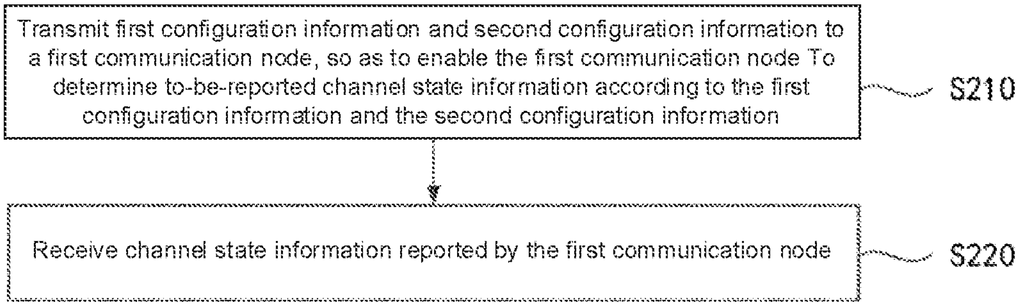
FIG. 2 is a flow chart of an information receiving method provided by the embodiments of the present disclosure.

In an embodiment, FIG. 2 is a flow chart of an information receiving method provided by the embodiments of the present disclosure. This embodiment may be performed by a second communication node. Herein, the second communication node may be a base station. As shown in FIG. 2, this embodiment includes: S210-S220, S210, transmitting first configuration information and second configuration information to a first communication node, so as to enable the first communication node to determine to-be-reported channel state information according to the first configuration information and the second configuration information; S220, receiving channel state information reported by the first communication node.

In an embodiment, the channel state information includes a precoding matrix indicator; a precoding matrix corresponding to the precoding matrix indicator is determined by a first group of vectors, or by a first group of vectors and a second group of vectors;

where the first group of vectors includes L vectors, the second group of vectors includes $M_v$ vectors; where L and $M_v$ are both positive integers;

a vector in the first group of vectors corresponds to a channel state information reference signal port; an element in a vector in the second group of vectors corresponds to a precoding matrix.

In an embodiment, the first configuration information includes a number P of channel state information reference signal ports. The number P of channel state information reference signal ports is transmitted by the second communication node to the first communication node. In the embodiment, the first communication node first receives a channel state information reference signal of the number P of channel state information reference signal ports, so that the first communication node, according to measuring of the received channel state information reference signal, selects $K_1$ channel state information reference signal ports from the P channel state information reference signal ports. Herein, L channel state information reference signal ports are selected in each polarization direction, $K_1=2L$; where each channel state information reference signal port in the L channel state information reference signal ports is mapped to a vector in the first group of vectors.

In an embodiment, the second configuration information includes a first proportion parameter; a manner for determining $K_1$ includes: determining $K_1$ according to the number P of the channel state information reference signal ports and the first proportion parameter.

In an embodiment, determining $K_1$ according to the number P of the channel state information reference signal ports and the first proportion parameter, includes:

determining a product value of the number P of the channel state information reference signal ports and the first proportion parameter;

determining a rounding value of a product value between the product value and a predetermined first fixed value; and determining $K_1$ according to the rounding value and a predetermined second fixed value.

In an embodiment, determining $K_1$ according to the number P of the channel state information reference signal ports and the first proportion parameter, includes:

determining a rounding value, where the rounding value is a rounding value of a product value of the number P of the channel state information reference signal ports, the first proportion parameter and a predetermined first fixed value; and determining $K_1$ according to the rounding value and a predetermined second fixed value.

In an embodiment, determining $K_1$ according to the number P of the channel state information reference signal ports and the first proportion parameter, includes:

determining $K_1$ according to a product value of the number P of the channel state information reference signal ports and the first proportion parameter.

In an embodiment, the second configuration information includes a first proportion parameter; a manner for determining L includes:

determining a product value of the number P of the channel state information reference signal ports and the first proportion parameter; and determining L according to a rounding value of a product value between the product value and a predetermined first fixed value.

In an embodiment, the second configuration information includes a first proportion parameter; a manner for determining L includes: determining L according to a rounding value, where the rounding value is a rounding value of a product value of the number P of the channel state information reference signal ports, the first proportion parameter and a predetermined first fixed value.

In an embodiment, the second communication node indicates a value of $M_v$ and a value of N by the second configuration information; where N candidate vectors are indicated by the value of N, the N candidate vectors are vectors with continuous index numbers; the $M_v$ vectors are determined from the N candidate vectors.

In an embodiment, indicating the value of $M_v$ and the value of N by the second configuration information, includes:

including the value of N in the second configuration information, and indicating the value of $M_v$ in accordance with the value of N.

In an embodiment, indicating the value of $M_v$ in accordance with the value of N, includes one of:

corresponding to the value of N being 1, the value of $M_v$ being 1;

corresponding to the value of N being 2, the value of $M_v$ being 2;

corresponding to the value of N being greater than 2, the value of $M_v$ being 2.

In an embodiment, indicating the value of $M_v$ and the value of N by the second configuration information, includes:

including the value of $M_v$ in the second configuration information, and indicating the value of N in accordance with the value of $M_v$.

In an embodiment, indicating the value of N in accordance with the value of $M_v$, includes one of:

corresponding to the value of $M_v$ being 1, the value of N being 1;

corresponding to the value of $M_v$ being 2, the value of N being equal to or greater than 2;

corresponding to the value of $M_v$ being 2, selecting a value from $\{2, N_i\}$ as the value of N; where $N_i$ is a value in $\{3, 4, 5\}$.

In an embodiment, indicating the value of $M_v$ and the value of N by the second configuration information, includes:

including a combination parameter in the second configuration information, and indicating the value of $M_v$ and the value of N in accordance with the combination parameter.

In an embodiment, whether the first communication node reports a vector in the second group of vectors to the second communication node is determined according to the value of $M_v$ and the value of N; or whether the first communication node reports a vector in the second group of vectors to the second communication node is determined according to the value of N.

In an embodiment, determining whether the first communication node reports a vector in the second group of vectors to the second communication node according to the value of $M_v$ and the value of $N_3$ includes one of:

corresponding to $M_v$ being equal to N, not reporting, by the first communication node, a vector in the second group of vectors to the second communication node;

corresponding to $M_v$ being not equal to N, reporting, by the first communication node, a vector in the second group of vectors to the second communication node.

In an embodiment, determining whether the first communication node reports a vector in the second group of vectors to the second communication node according to the value of N, includes one of:

corresponding to the value of N being $N_i$, reporting, by the first communication node, a vector in the second group of vectors to the second communication node;

corresponding to the value of N being less than $N_i$, not reporting, by the first communication node, a vector in the second group of vectors to the second communication node; where $N_i$ is a value in $\{3, 4, 5\}$;

corresponding to the value of N being greater than 2, reporting, by the first communication node, a vector in the second group of vectors to the second communication node;

corresponding to the value of N being less than or equal to 2, not reporting, by the first communication node, a vector in the second group of vectors to the second communication node.

In an embodiment, receiving the channel state information reported by the first communication node, includes: receiving the second group of vectors reported by the first communication node; where receiving the second group of vectors reported by the first communication node, includes: receiving an interval between index numbers corresponding to the $M_v$ vectors, reported by the first communication node.

In an embodiment, the second communication node receiving the second group of vectors reported by the first communication node, includes: corresponding to $M_v$ being 2 and N being greater than $M_v$, the second communication node receiving an index number of one vector reported by the first communication node, and where an index number of another vector is a predetermined value.

In an embodiment, the second communication node receiving the second group of vectors reported by the first communication node, includes: receiving the second group of vectors reported by using $\lceil \log_2(N-1) \rceil$ bits by the first communication node.

In the embodiment, the interpretation of the first configuration information, the second configuration information, and the channel state information are described in the above embodiments, and will not be repeated herein.

Figure 3:
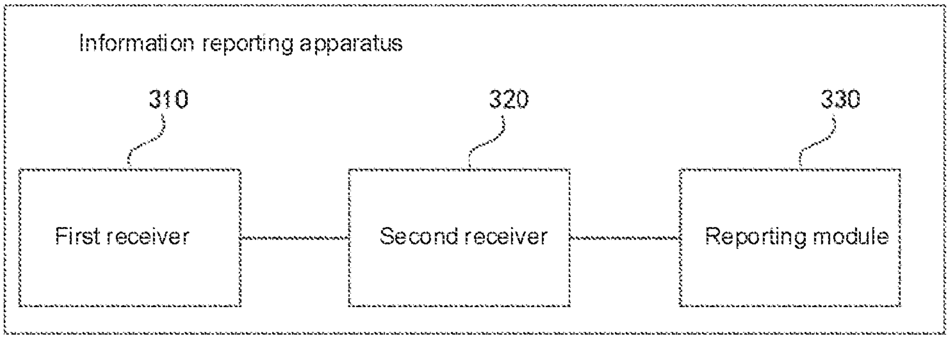
FIG. 3 is a structural block diagram of an information reporting apparatus provided by the embodiments of the present disclosure.

In an embodiment, FIG. 3 is a structural block diagram of an information reporting apparatus provided by the embodiments of the present disclosure. This embodiment is applied to a first communication node. As shown in FIG. 3, the information reporting apparatus in this embodiment includes: a first receiver 310, a second receiver 320, and a reporting module 330.

Herein, the first receiver 310 is configured to receive first configuration information and second configuration information of a second communication node.

The second receiver 320 is configured to receive a channel state information reference signal transmitted by the second communication node, in accordance with the first configuration information.

The reporting module 330 is configured to report channel state information according to the channel state information reference signal and the second configuration information.

In an embodiment, the channel state information includes a precoding matrix indicator; a precoding matrix corresponding to the precoding matrix indicator is determined by a first group of vectors, or by a first group of vectors and a second group of vectors;

where the first group of vectors includes L vectors, the second group of vectors includes $M_v$ vectors; where L and $M_v$ are both positive integers;

a vector in the first group of vectors corresponds to a channel state information reference signal port; an element in a vector in the second group of vectors corresponds to a precoding matrix.

In an embodiment, the first configuration information includes a number P of channel state information reference signal ports; reporting the channel state information, includes: select $K_1$ channel state information reference signal ports from the P channel state information reference signal ports;

where L channel state information reference signal ports are selected in each polarization direction, $K_1=2L$; where each channel state information reference signal port in the L channel state information reference signal ports is mapped to a vector in the first group of vectors.

In an embodiment, the second configuration information includes a first proportion parameter; a manner for determining $K_1$ includes: determining $K_1$ according to the number P of the channel state information reference signal ports and the first proportion parameter.

In an embodiment, determining $K_1$ according to the number P of the channel state information reference signal ports and the first proportion parameter, includes:

determining a product value of the number P of the channel state information reference signal ports and the first proportion parameter;

determining a rounding value of a product value between the product value and a predetermined first fixed value; and determining $K_1$ according to the rounding value and a predetermined second fixed value.

In an embodiment, determining $K_1$ according to the number P of the channel state information reference signal ports and the first proportion parameter, includes:

determining a rounding value, wherein the rounding value is a rounding value of a product value of the number P of the channel state information reference signal ports, the first proportion parameter and a predetermined first fixed value; and determining $K_1$ according to the rounding value and a predetermined second fixed value.

In an embodiment, determining $K_1$ according to the number P of the channel state information reference signal ports and the first proportion parameter, includes:

determining $K_1$ according to a product value of the number P of the channel state information reference signal ports and the first proportion parameter.

In an embodiment, the second configuration information includes a first proportion parameter; a manner for determining L includes:

determining a product value of the number P of the channel state information reference signal ports and the first proportion parameter; and determining L according to a rounding value of a product value between the product value and a predetermined first fixed value.

In an embodiment, the second configuration information includes a first proportion parameter; a manner for determining L includes:

determining L according to a rounding value, where the rounding value is a rounding value of a product value of the number P of the channel state information reference signal ports, the first proportion parameter and a predetermined first fixed value.

In an embodiment, the second communication node indicates a value of $M_v$ and a value of N by the second configuration information; where N candidate vectors are indicated by the value of N, the N candidate vectors are vectors with continuous index numbers; the $M_v$ vectors are determined from the N candidate vectors.

In an embodiment, indicating the value of $M_v$ and the value of N by the second configuration information, includes:

including the value of N in the second configuration information, and indicating the value of $M_v$ in accordance with the value of N.

In an embodiment, indicating the value of $M_v$ in accordance with the value of N, includes one of:

corresponding to the value of N being 1, the value of $M_v$ being 1;

corresponding to the value of N being 2, the value of $M_v$ being 2;

corresponding to the value of N being greater than 2, the value of $M_v$ being 2.

In an embodiment, indicating the value of $M_v$ and the value of N by the second configuration information, includes:

including the value of $M_v$ in the second configuration information, and indicating the value of N in accordance with the value of $M_v$.

In an embodiment, indicating the value of N in accordance with the value of $M_v$, includes one of:

corresponding to the value of $M_v$ being 1, the value of N being 1;

corresponding to the value of $M_v$ being 2, the value of N being equal to or greater than 2;

corresponding to the value of $M_v$ being 2, selecting a value from $\{2, N_i\}$ as the value of N; where $N_i$ is a value in $\{3, 4, 5\}$.

In an embodiment, indicating the value of $M_v$ and the value of N by the second configuration information, includes:

including a combination parameter in the second configuration information, and indicating the value of $M_v$ and the value of N in accordance with the combination parameter.

In an embodiment, the reporting module is further configured for:

determining a reporting case of a vector in the second group of vectors by the first communication node, according to the value of $M_v$ and the value of N; or determining a reporting case of a vector in the second group of vectors by the first communication node, according to the value of N.

In an embodiment, determining the reporting case of a vector in the second group of vectors by the first communication node, according to the value of $M_v$ and the value of N, includes:

corresponding to $M_v$ being equal to N, not reporting, by the first communication node, a vector in the second group of vectors to the second communication node;

corresponding to $M_v$ being not equal to N, reporting, by the first communication node, a vector in the second group of vectors to the second communication node.

In an embodiment, determining the reporting case of a vector in the second group of vectors by the first communication node, according to the value of N, includes one of:

corresponding to the value of N being $N_i$, reporting, by the first communication node, a vector in the second group of vectors to the second communication node;

corresponding to the value of N being less than $N_i$, not reporting, by the first communication node, a vector in the second group of vectors to the second communication node; where $N_i$ is a value in {3, 4, 5};

corresponding to the value of N being greater than 2, reporting, by the first communication node, a vector in the second group of vectors to the second communication node;

corresponding to the value of N being less than or equal to 2, not reporting, by the first communication node, a vector in the second group of vectors to the second communication node.

In an embodiment, reporting the second group of vectors to the second communication node by the first communication node, includes: reporting an interval between index numbers corresponding to the $M_v$ vectors, to the second communication node by the first communication node.

In an embodiment, reporting the second group of vectors to the second communication node by the first communication node, includes: corresponding to $M_v$ being 2 and N being greater than $M_v$, reporting an index number of one vector to the second communication node by the first communication node, and where an index number of another vector is a predetermined value.

In an embodiment, reporting the second group of vectors to the second communication node by the first communication node, includes: reporting the second group of vectors by using $\lceil \log_2(N-1) \rceil$ bits.

The information reporting apparatus provided by this embodiment is configured to implement the information reporting method applied to the first communication node as shown in the embodiment in FIG. 1. The information reporting apparatus provided by this embodiment has a similar implementation principle and technical effect, and it will not be repeated herein.

Figure 4:
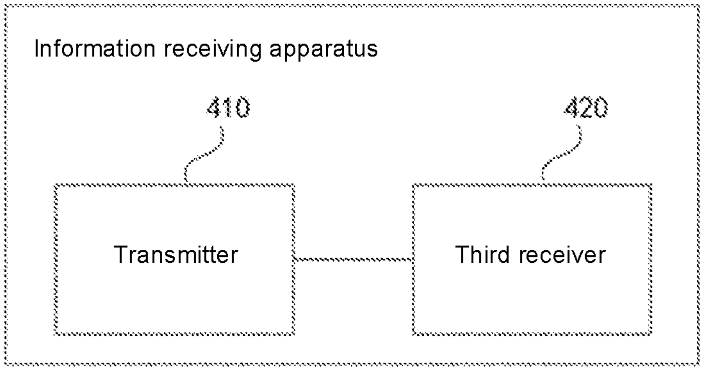
FIG. 4 is a structural block diagram of an information receiving apparatus provided by the embodiments of the present disclosure.

In an embodiment, FIG. 4 is a structural block diagram of an information receiving apparatus provided by the embodiments of the present disclosure. This embodiment may be performed by a second communication node. Herein, the second communication node may be a base station. As shown in FIG. 4, this embodiment includes: a transmitter 410 and a third receiver 420.

The transmitter 410 is configured to transmit the first configuration information and the second configuration information to a first communication node, so as enable the first communication node to determine to-be-reported channel state information according to the first configuration information and the second configuration information.

The third receiver 420 is configured to receive channel state information reported by the first communication node.

The information receiving apparatus provided by this embodiment is configured to implement the information receiving method applied to the second communication node as shown in the embodiment in FIG. 2. The information receiving apparatus provided by this embodiment has a similar implementation principle and technical effect, and will not be repeated herein.

Figure 5:
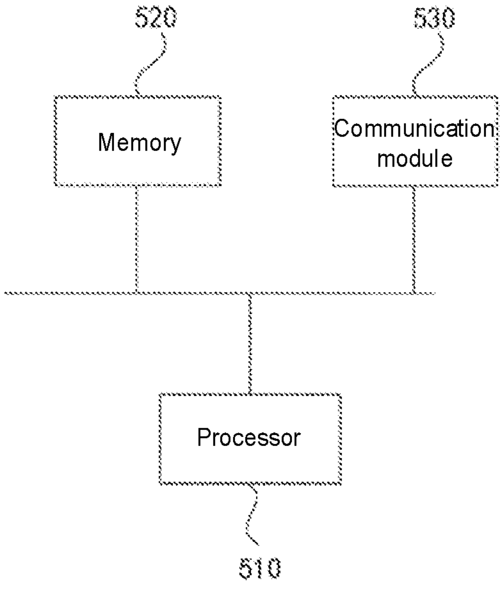
FIG. 5 is a structural schematic diagram of a communication device provided by the embodiments of the present disclosure.

FIG. 5 is a structural schematic diagram of a communication device provided by the embodiments of the present disclosure. As shown in FIG. 5, the communication device provided by the present disclosure includes: a processor 510, a memory 520, and a communication module 530. The number of processors 510 in the device may be one or more, and one processor 510 is taken as an example in FIG. 5. The number of memories 520 in the device may be one or more, and one memory 520 is taken as an example in FIG. 5. The processor 510, the memory 520 and the communication module 530 of the device may be connected by a bus or other means, and connection by the bus is taken as an example in FIG. 5. In this embodiment, the device may be the first communication node, for example, the first communication node may be a terminal side (e. g., a user device).

The memory 520, as a computer-readable storage medium, may be configured to store a software program, a computer-executable program, and a module, such as a program instruction/module (e.g., the first receiver 310, the second receiver 320, and the reporting module 330 in the information reporting apparatus) corresponding to the device in any embodiment of the present disclosure. The memory 520 may include a storage program area and a storage data area, where the storage program area may store an operating system, an application program required for at least one function; and the storage data area may store data created according to the usage of the service node, and so on. Additionally, the memory 520 may include a high-speed random access memory, and may also include a non-volatile memory, such as at least one magnetic disk storage device, a flash memory device, or other non-volatile solid-state storage device. In some instances, the memory 520 may further include memories disposed remotely relative to the processor 510, and these remote memories may be connected to the device by a network. The examples of the above network include, but are not limited to, the Internet, an intranet, a local area network, a mobile communication network and combinations thereof.

The communication module 530 is configured to perform communication interaction between the first communication node and the second communication node.

In a case where the communication device is the first communication node, the device provided above may be configured to perform the information reporting method applied to the first communication node provided by any of the above embodiments, and have the corresponding function and effect.

In a case where the communication device is the second communication node, the device provided above may be configured to perform the information receiving method applied to the second communication node provided by any of the above embodiments, and have the corresponding function and effect.

The embodiments of the present disclosure further provide a storage medium containing a computer-executable instruction, where the computer-executable instruction, when executed by a computer processor, is used to perform the information reporting method applied to the first communication node, and the method includes: receiving first configuration information and second configuration information of a second communication node; receiving a channel state information reference signal transmitted by the second communication node, in accordance with the first configuration information; and reporting channel state information according to the channel state information reference signal and the second configuration information.

The embodiments of the present disclosure further provide a storage medium containing a computer-executable instruction, where the computer-executable instruction, when executed by a computer processor, is used to perform the information receiving method applied to the second communication node, and the method includes: transmitting the first configuration information and the second configuration information to a first communication node, so that the first communication node determines to-be-reported channel state information according to the first configuration information and the second configuration information; and receiving channel state information reported by the first communication node.

Those skilled in the art should understand that, the term user device covers any suitable type of wireless user device, such as a mobile phone, a portable data processing apparatus, a portable network browser, or an on-board mobile platform.

Generally, multiple embodiments of the present disclosure may be implemented in a hardware or a dedicated circuit, a software, a logic, or any combination thereof. For example, some aspects may be implemented in the hardware, while other aspects may be implemented in a firmware or the software that may be executed by a controller, microprocessor or other computing apparatus, although the present disclosure is not limited thereto.

The embodiments of the present disclosure may be implemented by performing a computer program instruction by a data processor of a mobile apparatus, for example, in a processor entity, or by a hardware, or by a combination of a software and a hardware. The computer program instruction may be an assembly instruction, instruction set architecture (ISA) instruction, machine instruction, machine-related instruction, microcode, firmware instruction, state setting data, or source code or target code written in any combination of one or more programming languages.

A block diagram of any logic flow in drawings of the present disclosure may represent program steps, or may represent logic circuits, modules, and functions connected with each other, or may represent a combination of program steps with logic circuits, modules, and functions. A computer program may be stored on the memory. The memory may have any type suitable for a local technical environment and may be implemented by using any suitable data storage technology, such as but not limited to a read-only memory (ROM), random access memory (RAM), optical memory apparatus and system (digital video disc (DVD) or compact disk (CD)), etc. The computer-readable media may include a non-transitory storage medium. The data processor may be any type suitable for the local technology environment, for example, but not limited to a general-purpose computer, a dedicated computers, a microprocessor, a digital signal processor (Digital Signal Processing, DSP), an application specific integrated circuit (ASIC), programmable logic device (Field-Programmable Gate Array, FPGA) and a processor based on a multi-core processor architecture.

The above content is only a few embodiments of the present disclosure and is not used to restrict the present disclosure. For those skilled in the art, there may be various modifications and changes in the present disclosure. Any modification, equivalent replacement, improvement, etc., made within the spirit and principle of the present disclosure should be contained within the protection scope of the present disclosure.

What is claimed is:

1. An information reporting method, applied to a first communication node, wherein the method comprises:

receiving first configuration information and second configuration information of a second communication node;

receiving a channel state information reference signal transmitted by the second communication node, in accordance with the first configuration information; and reporting channel state information according to the channel state information reference signal and the second configuration information;

wherein the channel state information comprises a precoding matrix indicator; a precoding matrix corresponding to the precoding matrix indicator is determined by a first group of vectors, or by a first group of vectors and a second group of vectors;

wherein the first group of vectors comprises L vectors, the second group of vectors comprises $M_v$ vectors; wherein L and $M_v$ are both positive integers;

a vector in the first group of vectors corresponds to a channel state information reference signal port; an element in a vector in the second group of vectors corresponds to a precoding matrix;

wherein the second communication node indicates a value of $M_v$ and a value of N by the second configuration information; wherein N candidate vectors are indicated by the value of N, the N candidate vectors are vectors with continuous index numbers; the $M_v$ vectors are determined from the N candidate vectors;

wherein reporting the channel state information according to the channel state information reference signal and the second configuration information, comprises:

determining a reporting case of a vector in the second group of vectors by the first communication node, according to the value of $M_v$ and the value of N;

wherein determining the reporting case of a vector in the second group of vectors by the first communication node, according to the value of $M_v$ and the value of N, comprises:

corresponding to $M_v$ being equal to N, not reporting, by the first communication node, a vector in the second group of vectors to the second communication node; and corresponding to $M_v$ being not equal to N, reporting, by the first communication node, a vector in the second group of vectors to the second communication node.

2. The method according to claim 1, wherein the first configuration information comprises a number P of channel state information reference signal ports; reporting the channel state information, comprises:

selecting $K_1$ channel state information reference signal ports from the P channel state information reference signal ports;

wherein L channel state information reference signal ports are selected in each polarization direction, $K_1=2L$; wherein each channel state information reference signal port in the L channel state information reference signal ports is mapped to a vector in a first group of vectors.

3. The method according to claim 2, wherein the second configuration information comprises a first proportion parameter; a manner for determining $K_1$ comprises: determining $K_1$ according to the number P of the channel state information reference signal ports and the first proportion parameter.

4. The method according to claim 3, wherein determining $K_1$ according to the number P of the channel state information reference signal ports and the first proportion parameter, comprises:

determining a first product value of the number P of the channel state information reference signal ports and the first proportion parameter;

determining a rounding value of a second product value between the first product value and a predetermined first fixed value; and determining $K_1$ according to the rounding value and a predetermined second fixed value.

5. The method according to claim 3, wherein determining $K_1$ according to the number P of the channel state information reference signal ports and the first proportion parameter, comprises:

determining a first rounding value, wherein the first rounding value is a rounding value of a product value of the number P of the channel state information reference signal ports, the first proportion parameter and a predetermined first fixed value; and determining $K_1$ according to the first rounding value and a predetermined second fixed value; or determining $K_1$ according to a product value of the number P of the channel state information reference signal ports and the first proportion parameter.

6. The method according to claim 2, wherein the second configuration information comprises a first proportion parameter; a manner for determining L comprises:

determining a first product value of the number P of the channel state information reference signal ports and the first proportion parameter, and determining L according to a rounding value of a second product value between the first product value and a predetermined first fixed value; or determining the L according to a first rounding value, wherein the first rounding value is a rounding value of a product value of the number P of the channel state information reference signal ports, the first proportion parameter and a predetermined first fixed value.

7. The method according to claim 1, wherein indicating the value of $M_v$ and the value of N by the second configuration information, comprises:

comprising the value of N in the second configuration information, and indicating the value of $M_v$ in accordance with the value of N; or comprising the value of $M_v$ in the second configuration information, and indicating the value of N in accordance with the value of $M_v$.

8. The method according to claim 7, wherein indicating the value of $M_v$ in accordance with the value of N, comprises one of:

corresponding to the value of N being 1, the value of $M_v$ being 1;

corresponding to the value of N being 2, the value of $M_v$ being 2;

corresponding to the value of N being greater than 2, the value of $M_v$ being 2.

9. The method according to claim 7, wherein indicating the value of N in accordance with the value of $M_v$, comprises one of:

corresponding to the value of $M_v$ being 1, the value of N being 1;

corresponding to the value of $M_v$ being 2, the value of N being equal to or greater than 2;

corresponding to the value of $M_v$ being 2, selecting a value from $\{2, N_i\}$ as the value of N;

wherein $N_i$ is a value in $\{3, 4, 5\}$.

10. The method according to claim 1, wherein indicating the value of $M_v$ and the value of N by the second configuration information, comprises:

comprising a combination parameter in the second configuration information, and indicating the value of $M_v$ and the value of N in accordance with the combination parameter.

11. The method according to claim 1, further comprising: reporting the second group of vectors to the second communication node by the first communication node, wherein reporting the second group of vectors to the second communication node by the first communication node, comprises: reporting an interval between index numbers corresponding to the $M_v$ vectors, to the second communication node by the first communication node; or corresponding to $M_v$ being 2 and N being greater than $M_v$, reporting an index number of one vector to the second communication node by the first communication node, and wherein an index number of another vector is a predetermined value; or reporting the second group of vectors by using $\lceil \log_2 (N-1) \rceil$ bits.

12. An information receiving method, applied to a second communication node, wherein the method comprises:

transmitting first configuration information and second configuration information to a first communication node, so as to enable the first communication node to determine to-be-reported channel state information according to the first configuration information and the second configuration information; and receiving channel state information reported by the first communication node;

wherein the channel state information comprises a precoding matrix indicator; a precoding matrix corresponding to the precoding matrix indicator is determined by a first group of vectors, or by a first group of vectors and a second group of vectors;

wherein the first group of vectors comprises L vectors, the second group of vectors comprises $M_v$ vectors; wherein L and $M_v$ are both positive integers;

a vector in the first group of vectors corresponds to a channel state information reference signal port; an element in a vector in the second group of vectors corresponds to a precoding matrix;

wherein the second communication node indicates a value of $M_v$ and a value of N by the second configuration information; wherein N candidate vectors are indicated by the value of N, the N candidate vectors are vectors with continuous index numbers; the $M_v$ vectors are determined from the N candidate vectors;

wherein determine the to-be-reported channel state information according to the first configuration information and the second configuration information, comprises:

determining a reporting case of a vector in the second group of vectors by the first communication node, according to the value of $M_v$ and the value of N;

wherein determining the reporting case of a vector in the second group of vectors by the first communication node, according to the value of $M_v$ and the value of N, comprises:

corresponding to $M_v$ being equal to N, not reporting, by the first communication node, a vector in the second group of vectors to the second communication node; and corresponding to $M_v$ being not equal to N, reporting, by the first communication node, a vector in the second group of vectors to the second communication node.

13. A communication device, comprising a communication module, a memory, and one or more processors;

wherein the communication module is configured to perform communication interaction between a first communication node and a second communication node;

the memory is configured to store one or more programs;

the one or more programs, upon being executed by the one or more processors, cause the one or more processors to implement;

receiving first configuration information and second configuration information of a second communication node;

receiving a channel state information reference signal transmitted by the second communication node, in accordance with the first configuration information; and reporting channel state information according to the channel state information reference signal and the second configuration information;

wherein the channel state information comprises a precoding matrix indicator; a precoding matrix corresponding to the precoding matrix indicator is determined by a first group of vectors, or by a first group of vectors and a second group of vectors;

wherein the first group of vectors comprises L vectors, the second group of vectors comprises $M_v$ vectors; wherein L and $M_v$ are both positive integers;

a vector in the first group of vectors corresponds to a channel state information reference signal port; an element in a vector in the second group of vectors corresponds to a precoding matrix;

wherein the second communication node indicates a value of $M_v$ and a value of N by the second configuration information; wherein N candidate vectors are indicated by the value of N, the N candidate vectors are vectors with continuous index numbers; the $M_v$ vectors are determined from the N candidate vectors;

wherein reporting the channel state information according to the channel state information reference signal and the second configuration information, comprises:

determining a reporting case of a vector in the second group of vectors by the first communication node, according to the value of $M_v$ and the value of N;

wherein determining the reporting case of a vector in the second group of vectors by the first communication node, according to the value of $M_v$ and the value of N, comprises:

corresponding to $M_v$ being equal to N, not reporting, by the first communication node, a vector in the second group of vectors to the second communication node; and corresponding to $M_v$ being not equal to N, reporting, by the first communication node, a vector in the second group of vectors to the second communication node.

14. A non-transitory storage medium storing a computer program, wherein the computer program, upon being executed by a processor, implements the method of claim 1.

15. A communication device, comprising a communication module, a memory, and one or more processors;

wherein the communication module is configured to perform communication interaction between a first communication node and a second communication node;

the memory is configured to store one or more programs;

the one or more programs, upon being executed by the one or more processors, cause the one or more processors to implement the method of claim 12.

* * * * *